United States Patent
Niwa et al.

(10) Patent No.: US 11,211,846 B2
(45) Date of Patent: Dec. 28, 2021

(54) POWER TOOL

(71) Applicant: MAKITA CORPORATION, Anjo (JP)

(72) Inventors: Akira Niwa, Anjo (JP); Kei Kouda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 245 days.

(21) Appl. No.: 16/424,822

(22) Filed: May 29, 2019

(65) Prior Publication Data
US 2019/0280560 A1  Sep. 12, 2019

Related U.S. Application Data

(62) Division of application No. 15/002,652, filed on Jan. 21, 2016, now Pat. No. 10,348,158.

(30) Foreign Application Priority Data

Feb. 4, 2015 (JP) .................................. 2015-020491
Feb. 4, 2015 (JP) .................................. 2015-020492

(51) Int. Cl.
*H02K 3/28* (2006.01)
*H02K 7/14* (2006.01)
(Continued)

(52) U.S. Cl.
CPC .............. *H02K 7/145* (2013.01); *H02K 1/27* (2013.01); *H02K 3/24* (2013.01); *H02K 3/28* (2013.01);
(Continued)

(58) Field of Classification Search
CPC ........ H02K 3/28; H02K 3/50; H02K 2203/06; H02K 2203/09; H02K 5/225
See application file for complete search history.

(56) References Cited

U.S. PATENT DOCUMENTS

2003/0134522 A1  7/2003  Onose et al.
2004/0160141 A1  8/2004  Dube
(Continued)

FOREIGN PATENT DOCUMENTS

CA  2453730 A1  6/2005
CN  104052226 A  9/2014
(Continued)

OTHER PUBLICATIONS

Office Action from the Japanese Patent Office dated Oct. 29, 2019 in related Japanese application No. 2018-241461, and machine translation thereof.
(Continued)

*Primary Examiner* — Ramon M Barrera
(74) *Attorney, Agent, or Firm* — J-Tek Law PLLC; Jeffrey D. Tekanic; Scott T. Wakeman

(57) ABSTRACT

A power tool includes a motor (8) having a stator (9), a rotor (10) and three terminals (81). The stator includes a tubular stator core (60) having six teeth (63), first and second electrically insulating members (61, 62) affixed to the stator core, and six coils (64) wound around the teeth such that three phases are defined. The three terminals are held by the first electrically insulating member and are respectively electrically connected to the three phases. All of the six coils may be formed by winding a single continuous winding wire (101) sequentially around each of the six teeth. All of the three terminals (81) may be disposed within a semicircular area of the stator core. At least a first crossover wire portion (102) of the winding wire may be disposed on the second electrically insulating member.

20 Claims, 24 Drawing Sheets

(51) Int. Cl.

| | |
|---|---|
| *H02K 11/21* | (2016.01) |
| *H02K 1/27* | (2006.01) |
| *H02K 3/24* | (2006.01) |
| *H02K 29/08* | (2006.01) |
| *H02K 29/06* | (2006.01) |
| *H02K 11/215* | (2016.01) |
| *H02K 5/08* | (2006.01) |
| *H02K 5/22* | (2006.01) |
| *H02K 9/02* | (2006.01) |
| *H02K 1/14* | (2006.01) |

(52) U.S. Cl.
CPC ............... *H02K 5/08* (2013.01); *H02K 5/225* (2013.01); *H02K 9/02* (2013.01); *H02K 11/21* (2016.01); *H02K 11/215* (2016.01); *H02K 29/06* (2013.01); *H02K 29/08* (2013.01); *H02K 1/14* (2013.01); *H02K 2203/09* (2013.01); *H02K 2211/03* (2013.01)

(56) References Cited

U.S. PATENT DOCUMENTS

| | | |
|---|---|---|
| 2005/0020147 A1 | 1/2005 | Onose et al. |
| 2006/0255756 A1 | 11/2006 | Iwata et al. |
| 2009/0026859 A1 | 1/2009 | Kinoshita et al. |
| 2012/0200181 A1 | 8/2012 | Yoshida et al. |
| 2013/0207490 A1 | 8/2013 | Spearman et al. |
| 2013/0270932 A1 | 10/2013 | Hatfield et al. |
| 2013/0270934 A1 | 10/2013 | Smith et al. |
| 2014/0008088 A1 | 1/2014 | Chellew |
| 2014/0239751 A1 | 8/2014 | Tokairin et al. |
| 2014/0265739 A1 | 9/2014 | Iwai et al. |

FOREIGN PATENT DOCUMENTS

| | | |
|---|---|---|
| CN | 203818111 U | 9/2014 |
| EP | 1715565 A1 | 10/2006 |
| JP | H09261905 A | 10/1997 |
| JP | H11215756 A | 8/1999 |
| JP | 2003208928 A | 7/2003 |
| JP | 2007330065 A | 12/2007 |
| JP | 2009033786 A | 2/2009 |
| JP | 2009303363 A | 12/2009 |
| JP | 2014161977 A | 9/2014 |
| JP | 2014180164 A | 9/2014 |

OTHER PUBLICATIONS

Communication from European Patent Office dated Apr. 5, 2018 in related EP application No. 16153894.7, including Office Action, Applicant's response filed Mar. 31, 2017, examined claims 1-5 according to the Applicant's Main Request and examined claims 1-4 of Applicant's Auxiliary Request.

Partial European Search Report for related application No. EP 16153894.7.

Office Action from the Chinese Patent Office dated Jan. 7, 2019 in related Chinese application No. 201610077457.1, and machine translation thereof.

Office Action from the Japanese Patent Office dated Jun. 26, 2018 in related Japanese application No. 2015-020491, and translation thereof.

Office Action from the Japanese Patent Office dated Dec. 18, 2018 in related Japanese application No. 2015-020492, and machine translation thereof.

Office Action from the Japanese Patent Office dated Jul. 3, 2018 in related Japanese application No. 2015-020492, and machine translation thereof.

Office Action from the Japanese Patent Office dated Sep. 25, 2018 in related Japanese application No. 2015-020491, and machine translation thereof.

Office Action from the Japanese Patent Office dated Oct. 2, 2018 in related Japanese application No. 2015-020492, and machine translation thereof.

Office Action from the Chinese Patent Office dated Sep. 30, 2019 in related Chinese application No. 201610077457.1, and machine translation thereof.

Search Report from the Chinese Patent Office dated Sep. 22, 2019 in related Chinese application No. 201610077457.1.

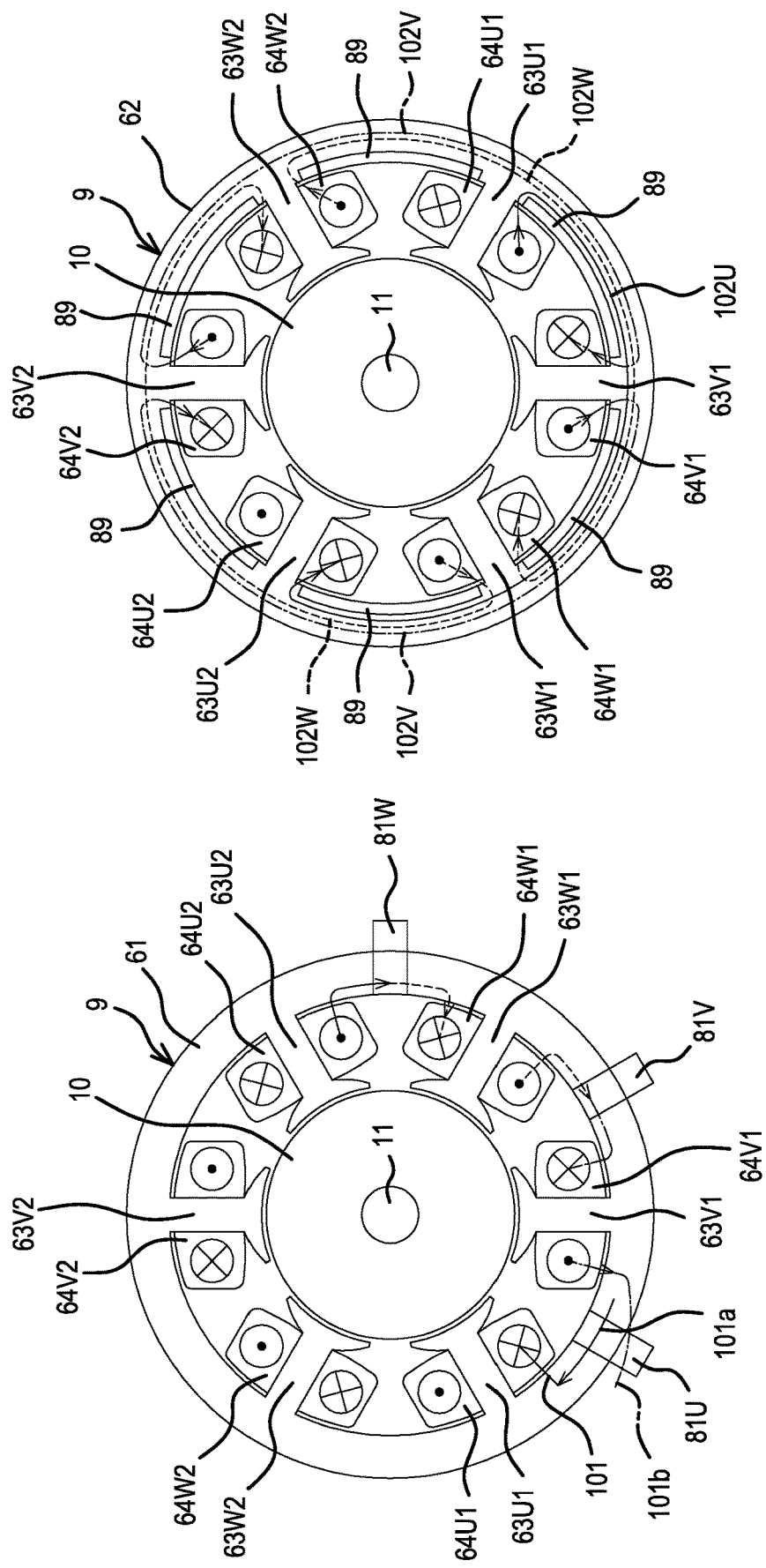

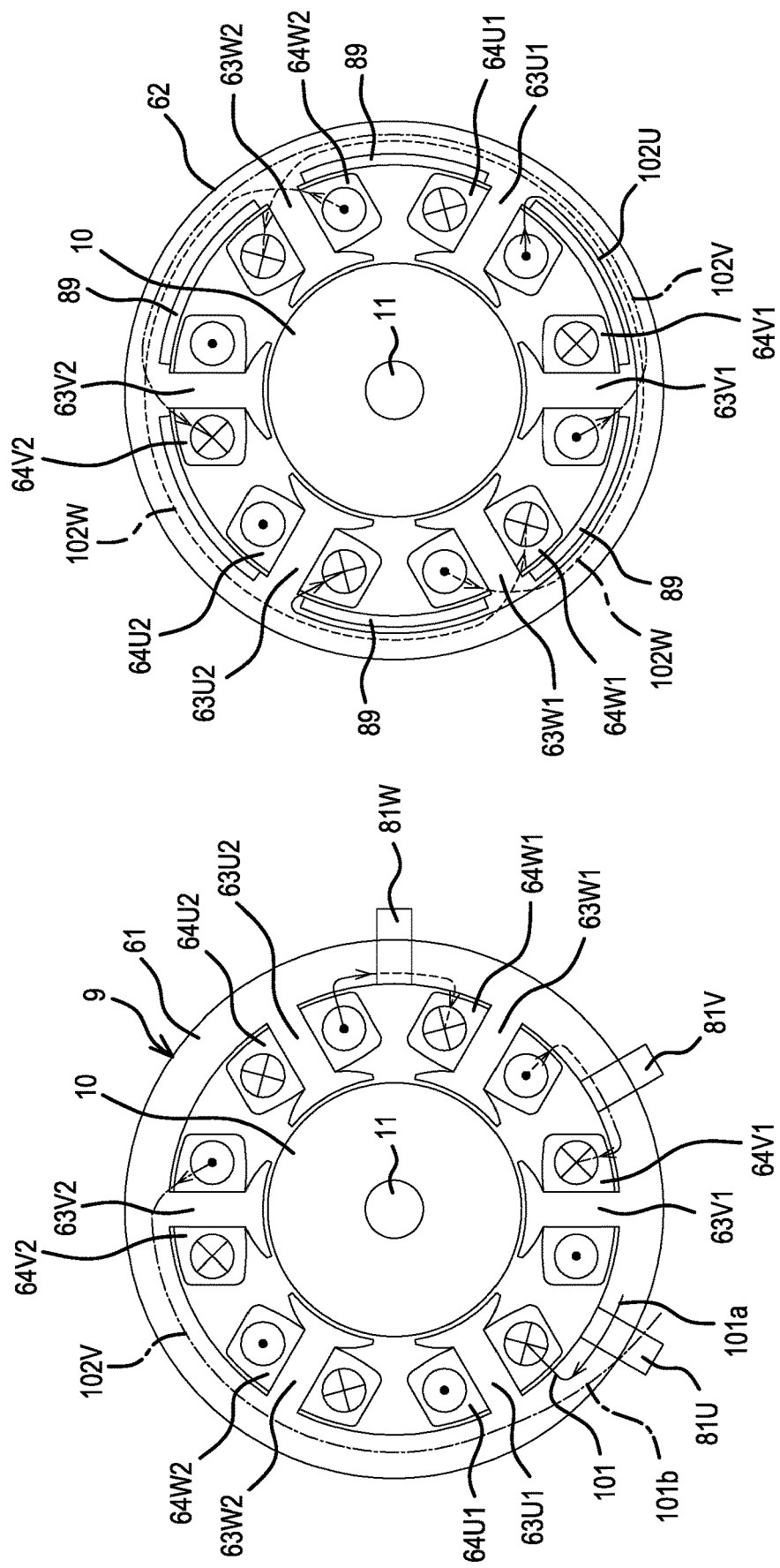

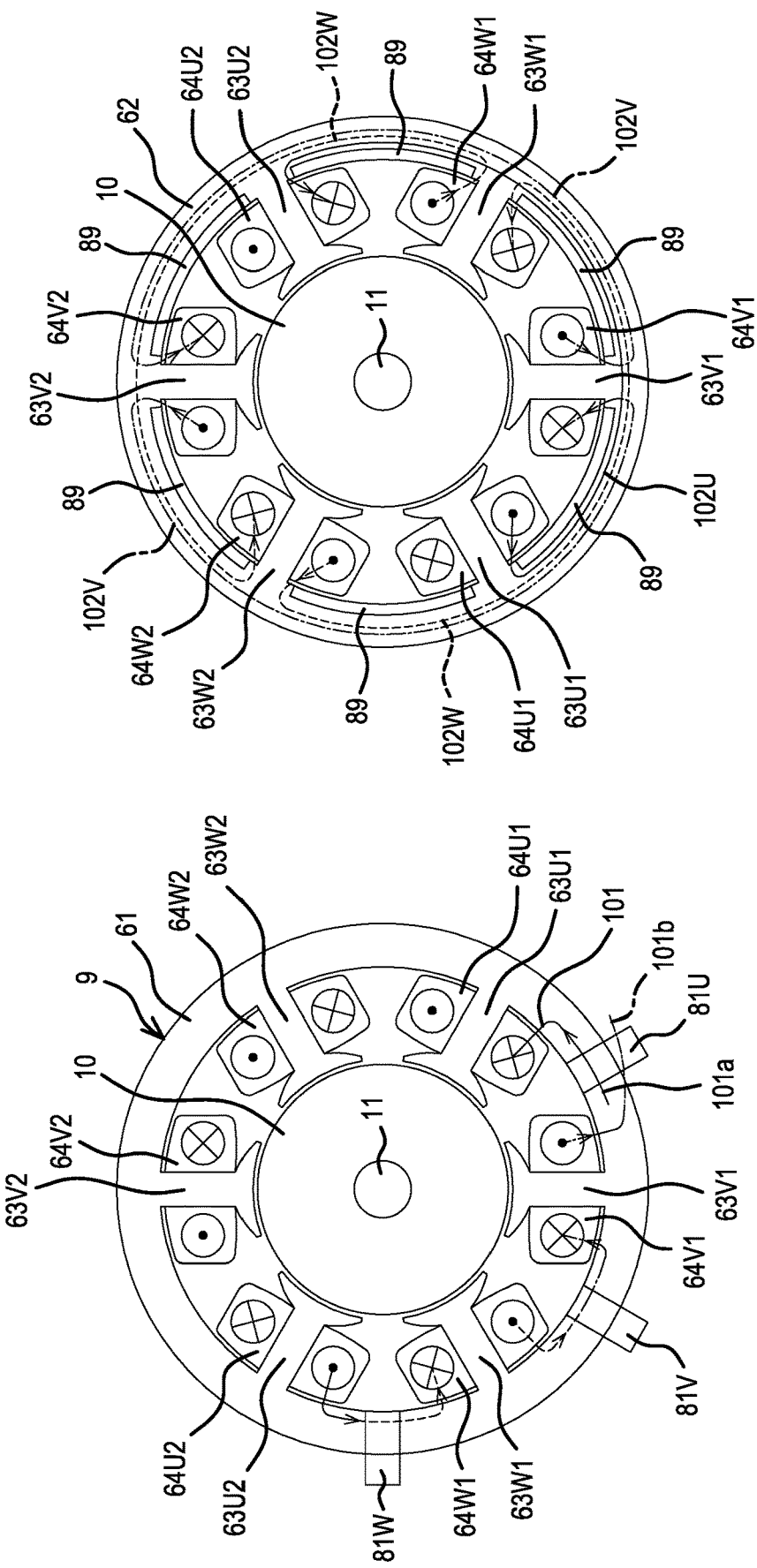

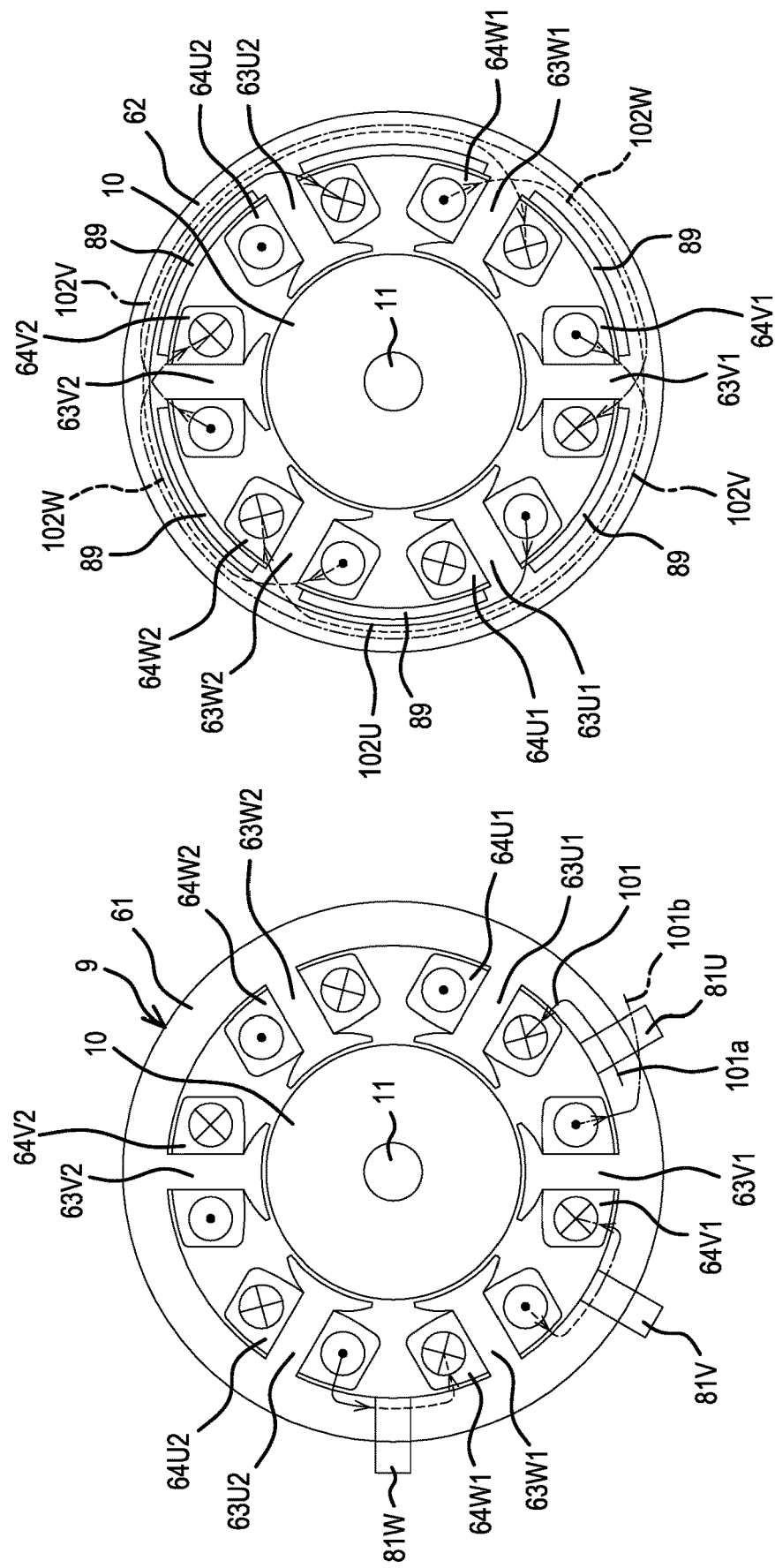

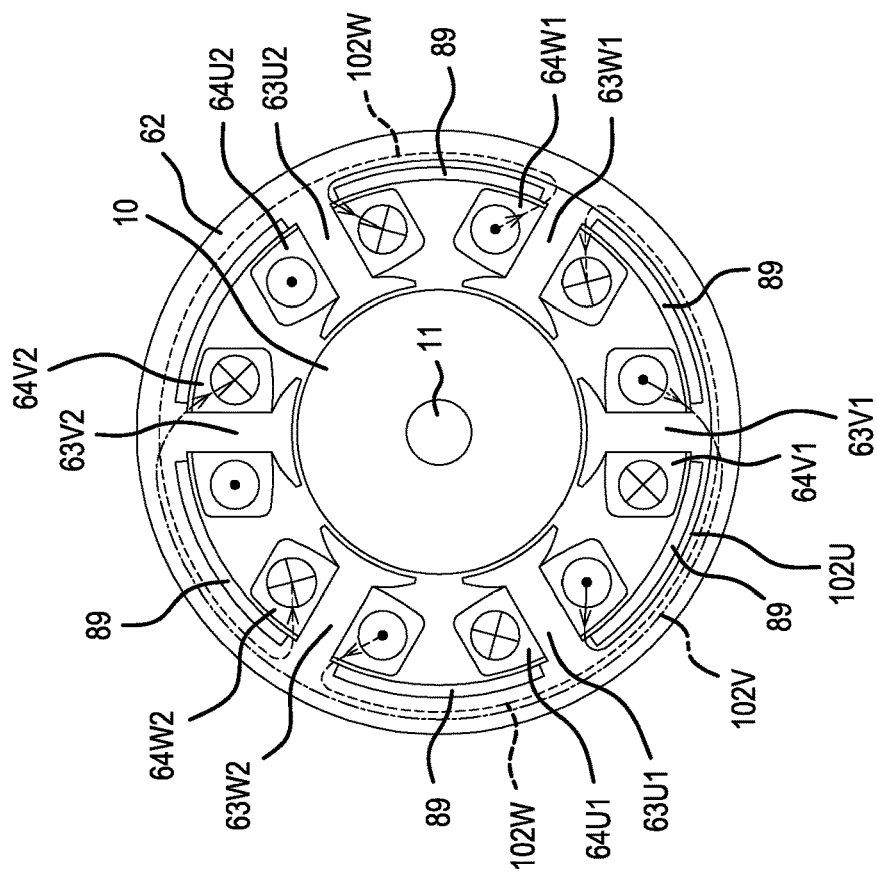
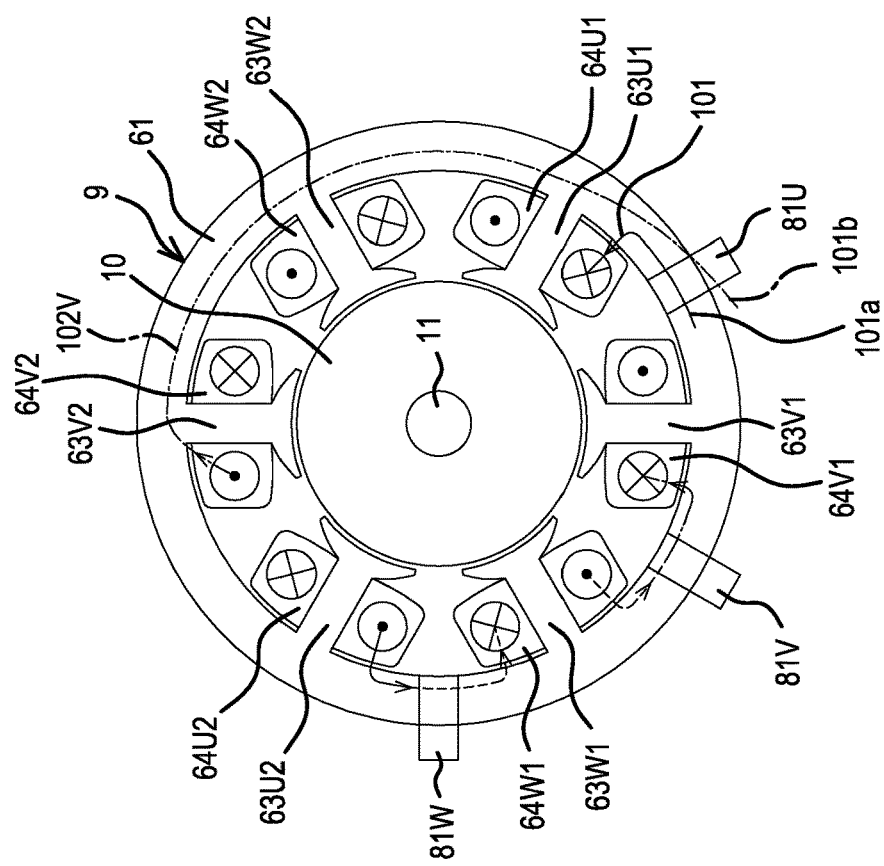
FIG.21B
FIG.21A

POWER TOOL

CROSS-REFERENCE

The present application is a divisional application of U.S. application Ser. No. 15/002,652 filed on Jan. 21, 2016, now U.S. Pat. No. 10,348,158, which claims priority to Japanese patent application serial numbers 2015-020491 and 2015-020492, both filed on Feb. 4, 2015, the contents of which are incorporated fully herein by reference.

TECHNICAL FIELD

The present invention relates to a power tool, such as a driver drill, that employs a motor having a wound-type stator.

BACKGROUND ART

Some known power tools, such as driver drills, utilize a motor (e.g., a brushless motor) having a wound-type stator that serves as its drive source. If a brushless motor is employed, then, as disclosed in US 2013/270932, electrically insulating members are respectively fixed to opposite ends of a stator core, which is formed by laminating a plurality of steel plates and which has a plurality of teeth (e.g., six) that protrude from an inner side of the stator core. Coils of each phase (all coils collectively constituting a multiphase winding wire) are respectively wound around each pair of teeth, which are positioned with point symmetry, i.e. which are diagonally opposite of each other. End parts of the coils are respectively connected to power-supply lines of each phase via terminals provided on the electrically insulating members. A discoidal sensor-circuit board, which comprises rotation-detection devices that detect the positions of permanent magnets provided on a rotor, is attached to one of the electrically insulating members.

In addition, Japanese Laid-open Patent Publication 2009-303363 discloses a stator of an electric motor that comprises six magnetic poles (teeth) that protrude from an inner side of the cylindrical stator core Again, coils of each phase are wound around point-symmetric pairs of the teeth, and all the coils collectively constitute a three-phase winding.

SUMMARY

A rotary shaft of the rotor is provided with a fan, and cooling of the motor is achieved by rotating the fan via the rotating rotary shaft, thereby causing cooling air to be drawn in from an outer part of the housing and passed through the motor. However, in US 2013/270932, crossover wires of the coils, each crossover wire being of one phase component and wound between the teeth of one pair, are wired along an outer circumference of the electrically insulating member attached to the sensor-circuit board. Consequently a gap between the electrically insulating member and the sensor-circuit board is narrowed by the crossover wires, thereby restricting the flow path for the cooling air to pass through. Therefore the coils cannot be effectively cooled.

In addition, in JP 2009-303363, if the three-phase winding is configured on six teeth, then the coils of the phases are wired to the power-supply lines at, for example, 120° intervals. Consequently, the power-supply lines extend from the circumference of the stator in three radial directions. To provide sufficient wiring space for the power-supply lines, the housing that houses the stator needs to be made larger in the radial direction, which adversely increases the size of the tool (i.e. a compact tool housing can not be achieved).

Accordingly, in one aspect of the present teachings, a power tool is disclosed wherein coils of a stator can be more effectively cooled.

In addition or in the alternative, in another aspect of the present teachings, wiring space for power-supply lines can be reduced, thereby enabling the size of the housing to be reduced.

In another aspect of the present teachings, a power tool comprises:
a motor, comprising:
a stator comprising: a tubular stator core; an electrically insulating member fixed to the stator core; and coils, which are wound around a plurality of teeth that protrude from an inner side of the stator core;
a rotor comprising: a rotor core disposed on an inner side of the stator; a rotary shaft fixed to the rotor core; and one or more permanent magnets fixed to the rotor core; and
a sensor-circuit board for detecting the position(s) of the permanent magnet(s) and being fixed to the stator;
wherein,
one or more notched parts (notch(es)) is (are) formed, in an outer circumference of the sensor-circuit board, such that it is (they are respectively) located between the teeth in an axial direction of the stator.

In another aspect of the present teachings, the stator and the sensor-circuit board are fixed via fixing parts at at least two locations arranged in a circumferential direction of the stator; and one notched part is formed between the two fixing parts.

In another aspect of the present teachings, at least two notched parts are formed at at least two locations in a circumferential direction of the stator. In such an embodiment, the sensor-circuit board may comprise a connection part for holding one or more lead wires that output(s) one or more detection signals, and the connection part may be disposed between the two notched parts.

In another aspect of the present teachings, the stator comprises terminals respectively connected to the coils and the terminals are respectively disposed in the notched parts.

In another aspect of the present teachings, there are six of the coils and the notched parts are respectively formed at six locations. Each of the notched parts respectively exposes one of the coils in the axial direction of the stator.

In another aspect of the present teachings, a power tool comprises:
a motor, comprising:
a stator, comprising: a tubular stator core; a first electrically insulating member and a second electrically insulating member fixed to front and rear end surfaces, respectively, of the stator core; and coils, which are wound around a plurality of teeth that protrude from an inner side of the stator core;
a rotor comprising: a rotor core disposed on an inner side of the stator; a rotary shaft fixed to the rotor core; and one or more permanent magnets fixed to the rotor core; and
a sensor-circuit board for detecting the position(s) of the permanent magnet(s) and being fixed to an outer-circumference side of the first electrically insulating member;
wherein,
terminals, which are connected to the coils and connected to power-supply lines, are provided on the first electrically insulating member.

In another aspect of the present teachings, the sensor-circuit board is screw fastened onto the first electrically insulating member.

In another aspect of the present teachings, there are three of the terminals and the coils are delta connected.

In another aspect of the present teachings, the terminals are respectively disposed between adjacent pairs of the teeth.

In another aspect of the present teachings, there are at least two of the terminals. In such an embodiment, the sensor-circuit board may comprise a connection part for holding one or more lead wires that output(s) one or more detection signals, and the connection part may be disposed between the two terminals.

In another aspect of the present teachings, a power tool comprises:
a motor, comprising:
a stator, comprising: a tubular stator core; electrically insulating members respectively fixed to front and rear end surfaces of the stator core; and coils, which are wound around a plurality of teeth that protrude from an inner side of the stator core;
a rotor, comprising: a rotor core disposed on an inner side of the stator; a rotary shaft fixed to the rotor core; and one or more permanent magnets fixed to the rotor core; and
a sensor-circuit board for detecting the position(s) of the permanent magnet(s) and being fixed to the stator;
wherein,
a groove is provided, on an outer circumference of the stator core, along an axial direction of the stator; and
mating pieces, which mate with the groove, are respectively formed integrally with the electrically insulating members.

In another aspect of the present teachings, a power tool, comprises:
a motor, comprising:
a stator, comprising: a tubular stator core; electrically insulating members respectively fixed to front and rear ends in an axial direction of the stator core; and coils of three phases that are wound around six teeth that protrude from an inner side of the stator core;
a rotor, comprising: a rotor core disposed on an inner side of the stator; and a rotary shaft fixed to the rotor core; and
three terminals, which are held by one of the electrically insulating members, the terminals being respectively connected to one coil of each phase;
wherein,
all of the coils are formed by winding one winding wire sequentially around the teeth, one phase component at a time; and
the three terminals are disposed inside an area of a semicircular portion of the stator core.

In another aspect of the present teachings, a crossover wire between the teeth, on which at least the coils of one phase are wound, is wired on the other electrically insulating member side.

In another aspect of the present teachings, a power tool comprises:
a motor, comprising:
a stator, comprising: a tubular stator core; electrically insulating members respectively fixed to front and rear ends in the axial direction of the stator core; and coils of three phases, which are wound around six teeth that protrude from an inner side of the stator core;
a rotor, comprising: a rotor core disposed on an inner side of the stator; and a rotary shaft fixed to the rotor core; and
three terminals, which are held by one of the electrically insulating members, the terminals being respectively connected to one coil of each phase;
wherein,
all of the coils are formed by winding one winding wire sequentially around the teeth, one phase component at a time; and
a crossover wire between the teeth, on which at least the coils of the one phase are wound, is wired on the other electrically insulating member side.

In another aspect of the present teachings, a rib that guides the crossover wire is integrally formed with the other electrically insulating member.

In another aspect of the present teachings, a power tool comprises:
a motor, comprising:
a stator, comprising: a tubular stator core; electrically insulating members respectively fixed to front and rear ends in the axial direction of the stator core; and coils of three phases, which are wound around six teeth that protrude from an inner side of the stator core;
a rotor, comprising: a rotor core disposed on an inner side of the stator; and a rotary shaft fixed to the rotor core; and
three terminals, which are held by one of the electrically insulating members, the terminals being respectively connected to one coil of each phase;
wherein,
at each of the terminals, the corresponding coils of one phase component and the power-supply line to those coils are electrically connected (fused).

In at least some aspects of the present teachings, air for cooling the motor can pass more easily through the inner side (interior) of the stator owing to the notched part(s) provided in the outer circumference of the sensor-circuit board, which makes it possible to cool the coils of the stator more effectively.

In addition or in the alternative, in at least some aspects of the present teachings, the space required for wiring the power-supply lines can be reduced, which makes it possible to make the housing more compact, e.g., in the radial direction of the motor.

BRIEF DESCRIPTION OF THE DRAWINGS

FIGS. 15A and B include schematic drawings showing a wire-winding method, wherein FIG. 15A shows a wiring-connection side and FIG. 15B shows an opposite wiring-connection side.

FIGS. 16A and B include schematic drawings that show a modified example of the wire-winding method, wherein FIG. 16A shows a wiring-connection side and FIG. 16B shows an opposite wiring-connection side.

FIGS. 17A and B include schematic drawings that show another modified example of the wire-winding method, wherein FIG. 17A shows a wiring-connection side and FIG. 17B shows an opposite wiring-connection side.

FIGS. 18A and B include schematic drawings that show another modified example of the wire-winding method, wherein FIG. 18A shows a wiring-connection side and FIG. 18B shows an opposite wiring-connection side.

FIGS. 19A and B include schematic drawings that show another modified example of the wire-winding method, wherein FIG. 19A shows a wiring-connection side and FIG. 19B shows an opposite wiring-connection side.

FIGS. 20A and B include schematic drawings that show another modified example of the wire-winding method, wherein FIG. 20A shows a wiring-connection side and FIG. 20B shows an opposite wiring-connection side.

FIGS. 21A and B include schematic drawings that show another modified example of the wire-winding method, wherein FIG. 21A shows a wiring-connection side and FIG. 21B shows an opposite wiring-connection side.

FIGS. 22A and B include schematic drawings that show another modified example of the wire-winding method, wherein FIG. 22A shows a wiring-connection side and FIG. 22B shows an opposite wiring-connection side.

FIGS. 23A and B include schematic drawings that show another modified example of the wire-winding method, wherein FIG. 23A shows a wiring-connection side and FIG. 23B shows an opposite wiring-connection side.

FIGS. 24A and B include schematic drawings that show another modified example of the wire-winding method, wherein FIG. 24A shows a wiring-connection side and FIG. 24B shows an opposite wiring-connection side.

DETAILED DESCRIPTION

Figure 1:
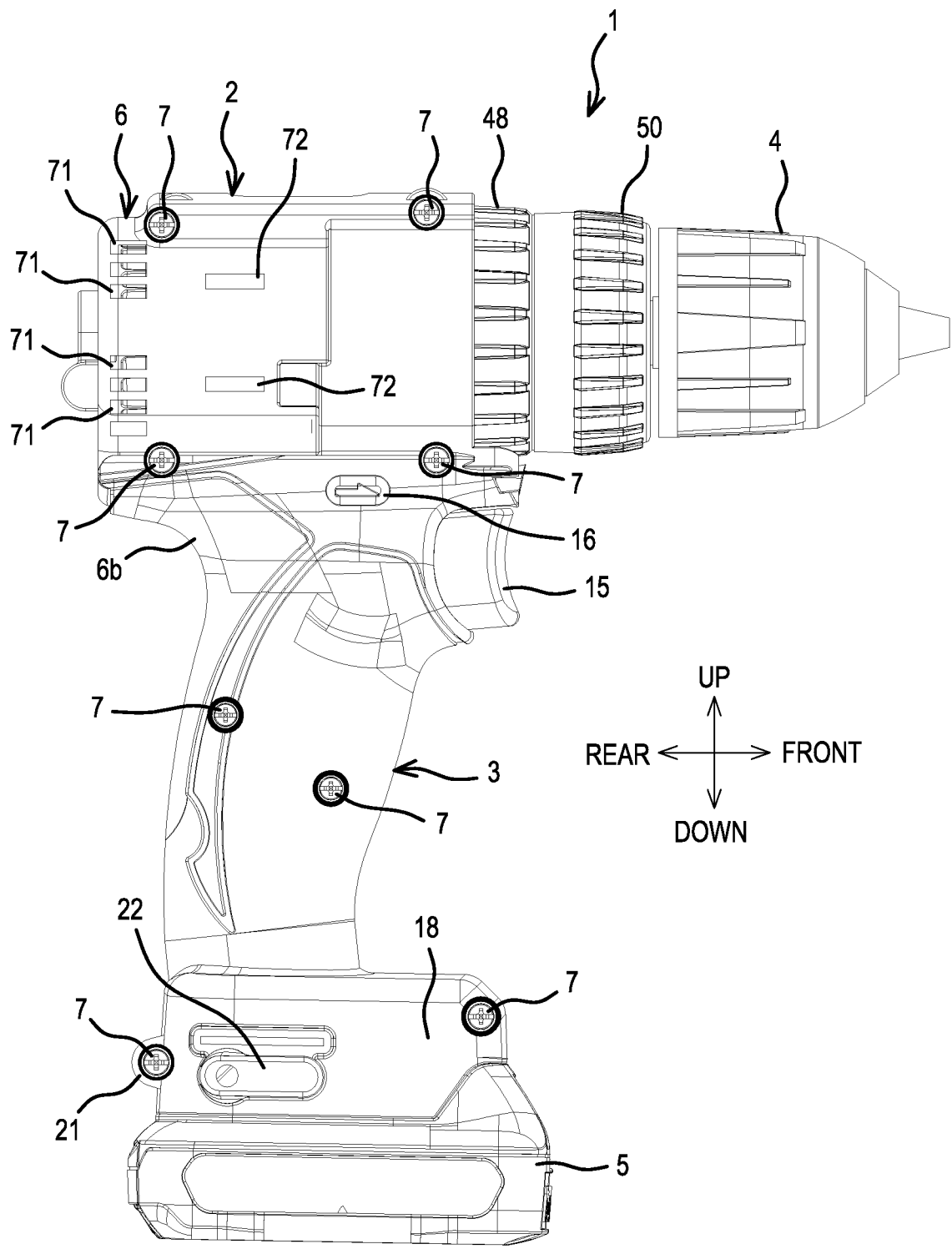
FIG. 1 is a side view of a hammer driver-drill according to one representative, non-limiting embodiment of the present teachings.
Figure 2:
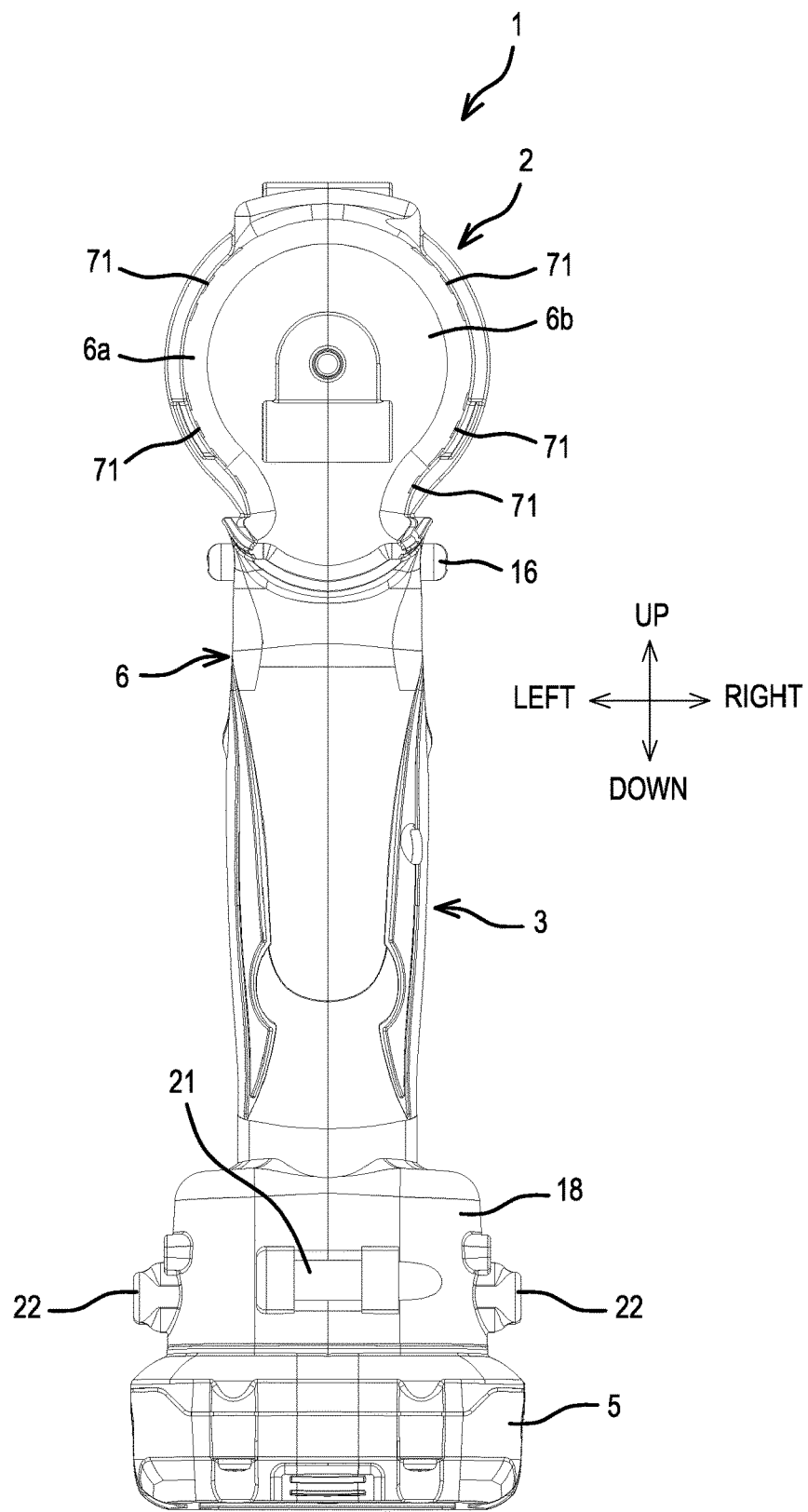
FIG. 2 is a rear view of the hammer driver-drill.
Figure 3:
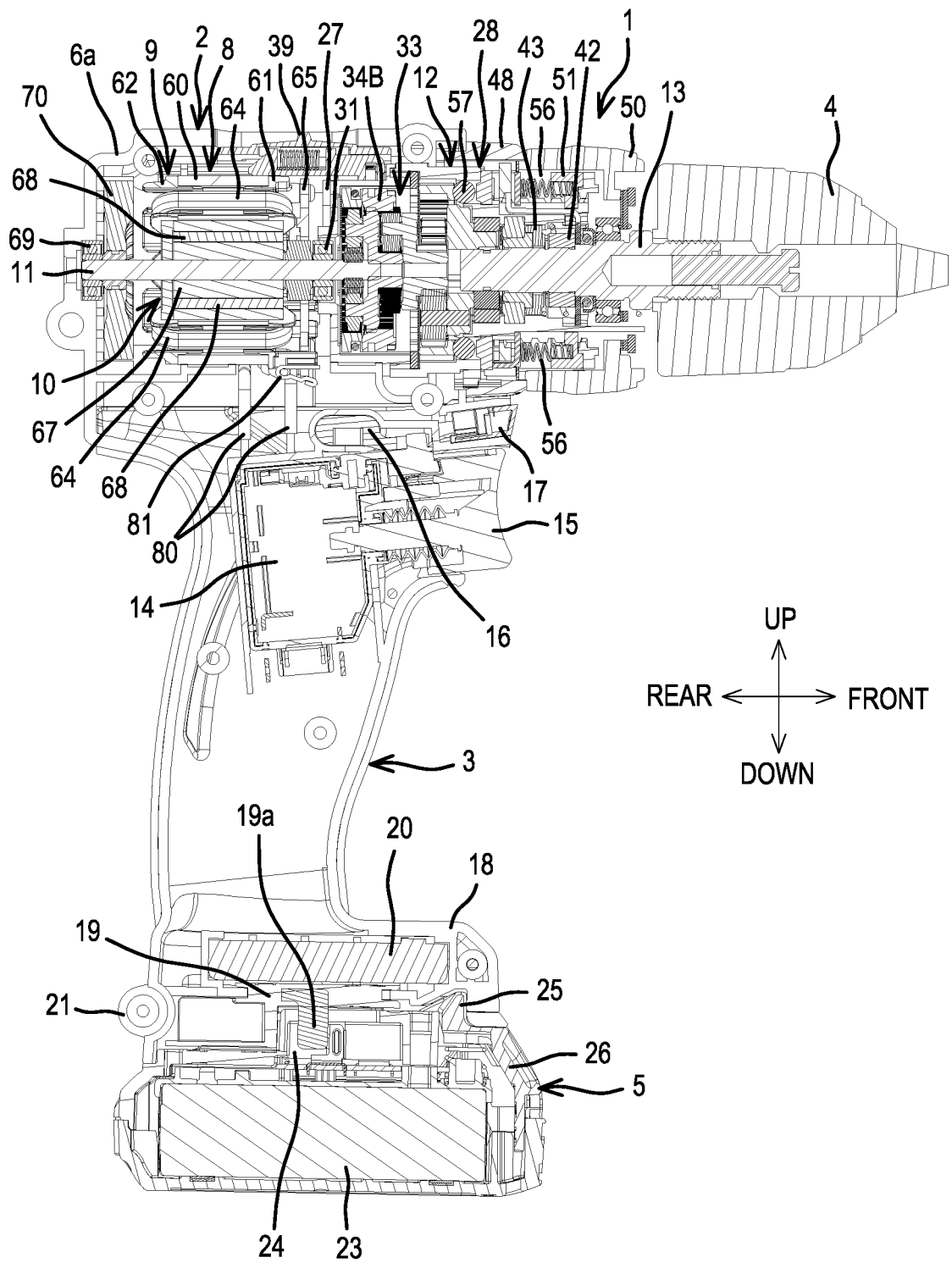
FIG. 3 is a longitudinal-cross-sectional view of the hammer driver-drill.
Figure 4:
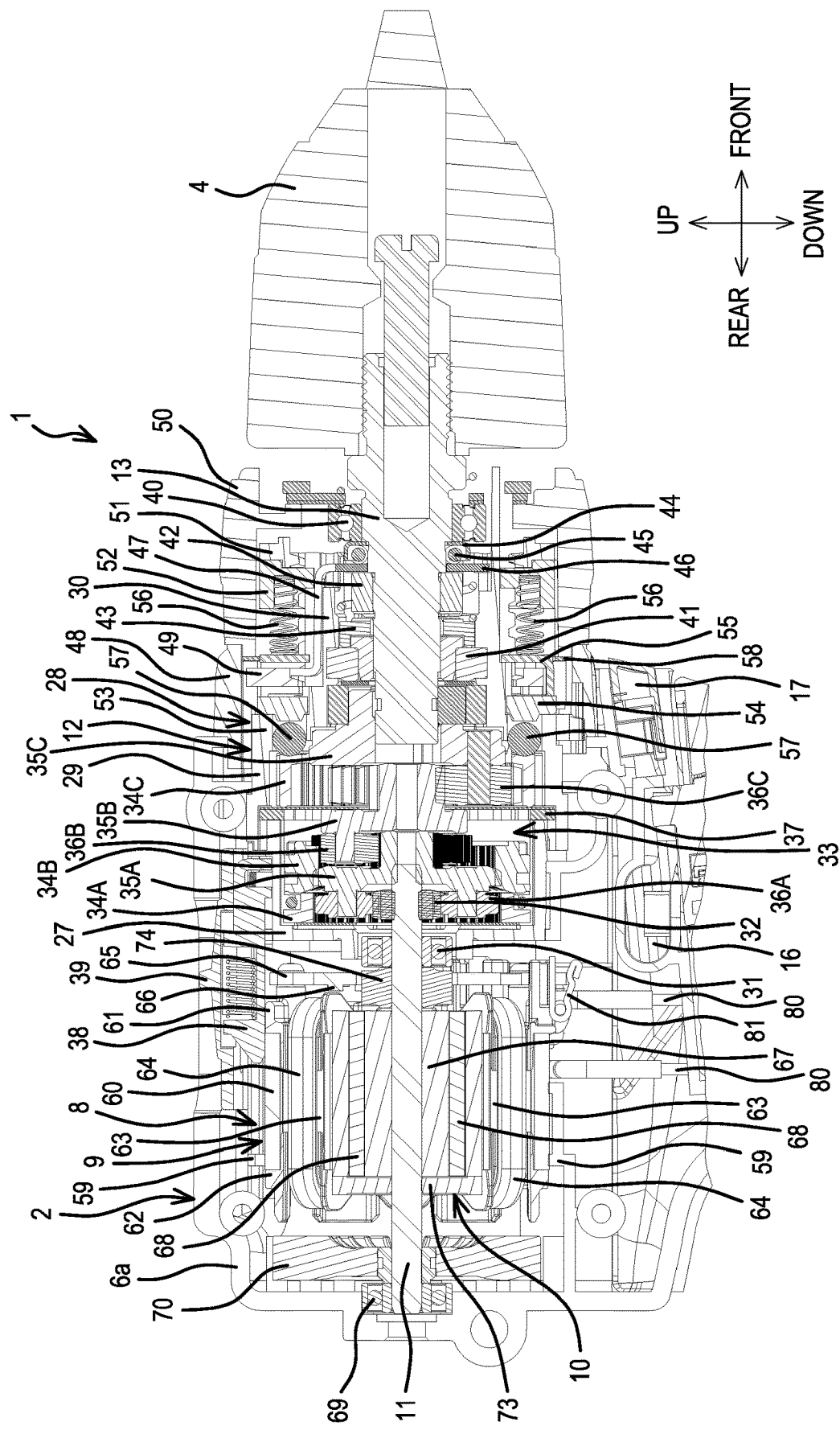
FIG. 4 is an enlarged view of a main body portion.
Figure 5:
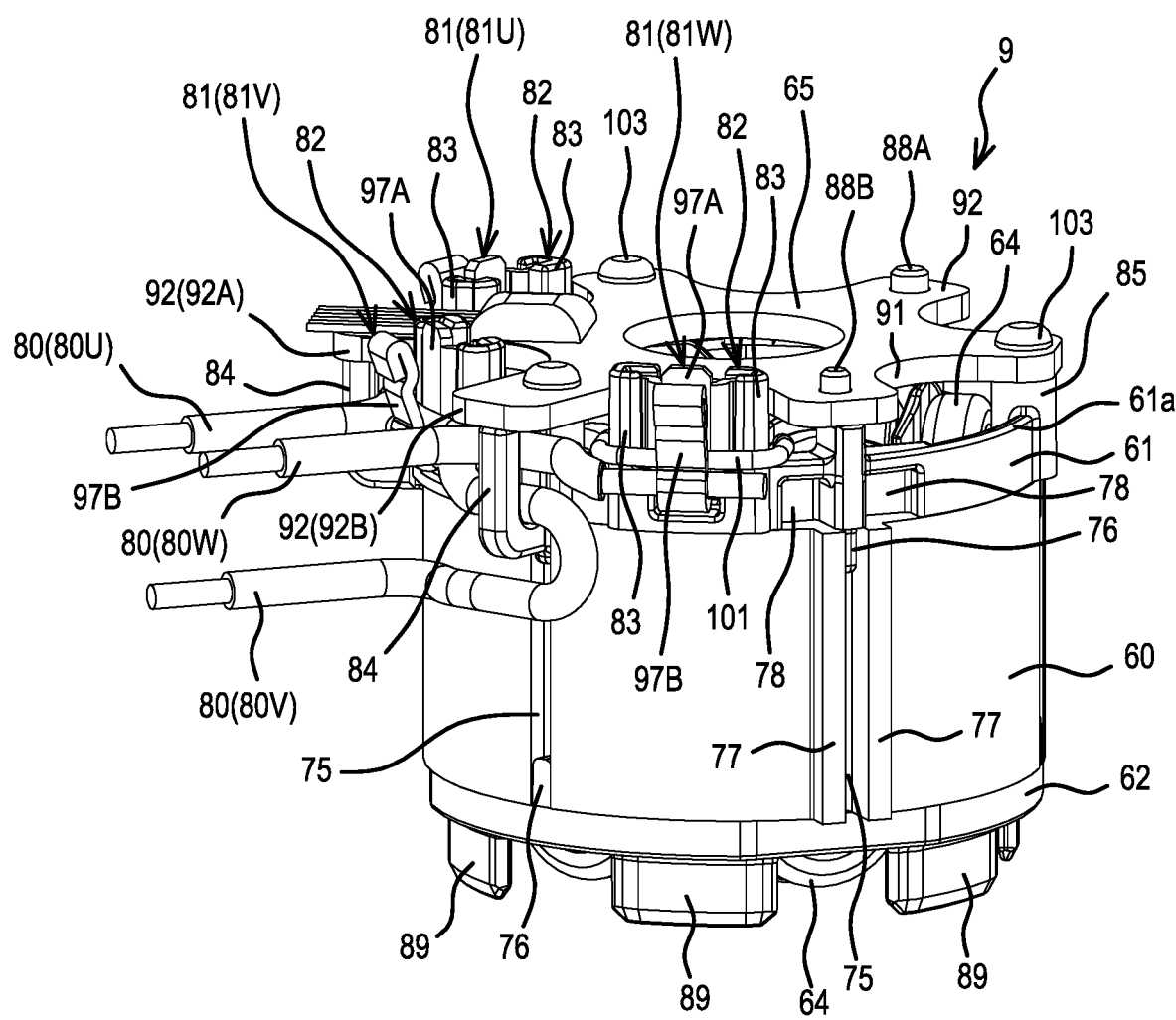
FIG. 5 is an oblique view of a stator.

Embodiments of the present teachings are explained below, with reference to the drawings.

The hammer driver-drill 1 shown in FIGS. 1-4 includes a handle 3 that protrudes downward from a main body 2 that extends in a front-rear direction. A drill chuck 4 is configured or adapted to grasp at its tip a bit and is provided on a front end of the main body 2. A battery pack 5 serves as a power supply and is detachably mounted on a lower end of the handle 3. A housing 6 is formed by joining (assembling), using screws 7 extending in the left-right direction, left and right half housings 6a, 6b, which continuously form the handle 3 and a rear-half portion of the main body 2.

A rear portion within the main body 2 houses a tubular stator 9 and a rotor 10, which is disposed in an inner part (interior) of the stator 9. An inner-rotor type brushless motor 8 comprising a rotary shaft 11 is housed in the rotor 10. A gear assembly 12 comprises a spindle 13 that protrudes forward from the housing 6. The gear assembly 12 is located (assembled) forward of the brushless motor 8 and serves to convert the rotation of the rotary shaft 11 into a lower speed that is transmitted to the spindle 13. The drill chuck 4 is attached to a front end of the spindle 13. Below the main body 2, a switch 14 is housed in an upper part of the handle 3, and a trigger 15 protrudes forward thereof. A motor forward/reverse-changing button (reversing switch lever) 16 is provided upward of the switch 14; forward thereof, an LED 17 that illuminates forward of the drill chuck 4 is housed in a diagonally upward orientation.

A mounting part 18, onto which the battery pack 5 is slidably mounted from the front, is formed on a lower end of the handle 3. The mounting part 18 houses: a terminal block 19, which comprises terminals 19a to which the battery pack 5 is electrically connected; and a controller 20, which comprises a microcontroller (e.g., microprocessor, memory, etc.) that controls the brushless motor 8, six switching devices, etc., and whereto the switch 14, the stator 9 of the brushless motor 8, and the like are electrically connected. A strap-anchoring part 21 is provided on a rear surface of the mounting part 18 using a screw boss. Reference numbers 22 are hook-attachment parts for detachably attaching a hook that can be used to hang the power tool on a tool belt when the driver-drill 1 is not in use. The battery pack 5 further includes a rechargeable battery 23 (herein, a 10.8 V rechargeable battery provided with three (lithium ion) battery cells), terminals 24, and a locking (latching) hook 25. The hook 25 can be released from a corresponding latching part provided on the mounting part 18 by pushing down a button 26 located on a front surface of the battery pack 5.

The gear assembly 12 includes a tubular first gear case 27, which is located forward of the brushless motor 8, and a second gear case 28, which is affixed forward of the first gear case 27 and has a two-step tubular shape, i.e. it includes a large-diameter part 29 and a small-diameter part 30. The first gear case 27 supports the rotary shaft 11 via a bearing 31, and a tip of the rotary shaft 11, to which a pinion 32 is attached, protrudes into the gear assembly 12.

A planetary-gear speed-reducing mechanism 33 includes three stages of carriers 35A-35C, which respectively support a plurality of planet gears 36A-36C respectively revolving inside internal gears 34A-34C, disposed in an axial direction. The speed-reducing mechanism 33 is housed in an inner part of the gear assembly 12, and the pinion 32 of the rotary shaft 11 meshes with the first-stage planet gear 36A. The second-stage internal gear 34B is rotatable and moveable frontward and rearward in the axial direction; at an advanced (forward) position, the second-stage internal gear 34B is capable of meshing with a coupling ring 37, which is held inside the large-diameter part 29.

A speed change lever 39, which is provided in the housing 6 such that it is capable of sliding frontward and rearward, is coupled to the internal gear 34B via a linking member 38. When the speed change lever 39 is slid rearward, the internal gear 34B retracts via the linking member 38 and meshes with an outer circumference of the first-stage carrier 35A while maintaining the meshing with the second-stage planet gear 36B. Thereby, a high-speed mode results wherein the second-stage deceleration is omitted (cancelled). Conversely, when the speed change lever 39 is slid forward, the internal gear 34B advances, separating from the carrier 35A, via the linking member 38, and meshes with the coupling ring 37 while maintaining the meshing with the second-stage planet gear 36B, and thereby rotation is inhibited. Thereby, a low-speed mode results wherein the second-stage deceleration functions.

A hammer mechanism that imparts percussion (hammering) to the spindle 13 in the axial direction is provided on an inner side of the small-diameter part 30 of the second gear case 28. Furthermore, a clutch mechanism, which cuts off the transmission of torque to the spindle 13 at a prescribed load on the spindle 13, is provided on an outer side of the small-diameter part 30. This design provides three switchable operating modes, namely (i) a hammer-drill mode, in which the spindle 13 is hammered while it rotates, (ii) a drilling mode, in which the spindle 13 only rotates without being hammered, and (iii) a clutch mode (driving mode), in which the transmission of torque to the spindle 13 is cut off at a prescribed load. Each of the operating modes and mechanisms will be further explained in the following.

In the hammer (percussion) mechanism, the spindle 13 is axially supported by front and rear bearings 40, 41 inside the small-diameter part 30, and a rear end of the spindle 13 is slidably coupled to the third-stage carrier 35C. Between the bearings 40, 41 in the spindle 13, a ring-shaped first cam 42 and a ring-shaped second cam 43 are externally mounted coaxially from the front. The first cam 42 has a cam gear on its rear surface and is coupled to the spindle 13 via a spline. A cam gear is formed on the front surface of the second cam 43, and the second cam 43 is loosely placed around the spindle 13 and non-rotatably disposed inside the small-diameter part 30.

Furthermore, forward of the first cam 42, a plurality of steel balls 45 is held by a ring-shaped receiving plate 44 between the first cam 42 and the bearing 40, and a cam plate 46 is provided between the steel balls 45 and the first cam 42. An arm 47 extends rearward from the cam plate 46. The arm 47 is linked via a linking plate 49 to a mode-changing ring 48, which is rotatably joined (assembled) to the large-diameter part 29 and is forward of the housing 6. When the linking plate 49 is rotated as a result of a manual rotation of the mode-changing ring 48, the first cam 42 is slid rearward via the cam plate 46 and is caused to mesh with the second cam 43.

In the clutch mechanism, a clutch ring 50 is externally mounted rotatably to the small-diameter part 30 forward of the mode-changing ring 48. On an inner side of the clutch ring 50, a screw-feeding plate 51, which screws onto a screw part formed on an outer circumference of the small-diameter part 30, is provided integrally rotatable with the clutch ring 50 and moveable in the axial direction. Rearward of the screw-feeding plate 51, a front receiving plate 52 capable of forward-rearward movement in the axial direction is provided on the small-diameter part 30 in a state wherein the rotation of the front receiving plate 52 is restricted. A pressing plate 54, which makes contact with a front surface of a closure part 53 between the large-diameter part 29 and the small-diameter part 30, and a rear receiving plate 55, which is forward thereof, are provided rearward of the front receiving plate 52. A plurality of coil springs 56 are disposed, equispaced in a circumferential direction, between the front receiving plate 52 and the rear receiving plate 55.

In addition, rearward of the pressing plate 54, a plurality of steel balls 57 is held, such that the steel balls 57 are equispaced in the circumferential direction, by the closure part 53. The steel balls 57 contact a front surface of the third-stage internal gear 34C, which is rotatable, and are capable of engaging in a circumferential direction with a clutch cam, which is not shown and is provided such that it protrudes from the front surface of the internal gear 34C. A biasing force of the coil springs 56, 56 is transmitted to the internal gear 34C via the steel balls 57, the pressing plate 54, and the rear receiving plate 55, and this biasing force causes the rotation of the internal gear 34C to be restricted or prevented. The clutch ring 50 is rotationally operated to screw-feed the screw-feeding plate 51 and the front receiving plate 52 in the axial direction so as to change the axial length of the coil springs 56, thereby making it possible to modify the pressing (biasing) force imparted (applied) to the internal gear 34C.

Each operation mode will now be explained in the following. First, at a first rotational position of the mode-changing ring 48, which is a phase (operation mode, i.e. the clutch mode) in which the cam plate 46 does not slide the first cam 42 rearward, the first cam 42 is disposed forward of the second cam 43 and does not mesh with the second cam 43. Consequently, the rotational operation of the clutch ring 50 results in a clutch mode in which the pressing (biasing) force imparted (applied) to the internal gear 34C is modifiable.

In this clutch mode, when the trigger 15 is squeezed to drive the brushless motor 8, the rotary shaft 11 rotates and the spindle 13 rotates via the planetary-gear speed-reducing mechanism 33, thereby making it possible to perform a screw tightening operation or the like with a driver bit mounted in the drill chuck 4. As the screw tightening progresses, the load imparted (applied) to the spindle 13 eventually exceeds the pressing (biasing) force of the coil springs 56 that fixes (holds) the internal gear 34C. When this happens, the clutch cam of the internal gear 34C pushes out the steel balls 57, the pressing plate 54, and the rear receiving plate 55 forward, the internal gear 34C is idled, and thus the screw tightening ends (clutch operation).

Next, at a second rotational position at which the mode-changing ring 48 has been rotated by a prescribed angle from the clutch mode, a restraining ring 58, which is provided on the mode-changing ring 48, engages with the rear receiving plate 55, thereby restricting the advance of the rear receiving plate 55. Consequently, the drilling mode results wherein the movement of the pressing plate 54 forward is continuously restricted (prevented) regardless of the pressing (biasing) force of the coil springs 56.

When the spindle 13 is rotated in the drilling mode, regardless of the load imparted (applied) to the spindle 13, the steel balls 57 do not ride over the clutch cam of the internal gear 34C, and consequently the rotation of the spindle 13 continues while the fixed state of the internal gear 34C remains unchanged. Furthermore, at this time too, the first cam 42 does not slide rearward, and consequently hammering (percussion) on the spindle 13 does not occur.

Furthermore, at a third rotational position at which the mode-changing ring 48 has been further rotated by a prescribed angle from that of the drilling mode, the cam plate 46 slides the first cam 42 rearward. However, the engagement of the restraining ring 58 and the rear receiving plate 55 does not change. Consequently, a hammer mode results wherein the first cam 42 and the second cam 43 engage.

When the spindle 13 is rotated in the hammer mode, the first cam 42, which rotates integrally with the spindle 13, engages with (slides over) the second cam 43 fixed inside the small-diameter part 30, and consequently hammering (percussion) on the spindle 13 occurs. Furthermore, because the fixed state of the pressing plate 54 does not change owing to the restraining ring 58, the rotation of the spindle 13 continues regardless of the load imparted (applied) to the spindle 13.

Turning now to the details of the motor 8, the stator 9 of the three-phase brushless motor 8 is held, with the front-rear direction serving as the axis, by ribs 59, 59 formed on inner surfaces of the half housings 6a, 6b. As shown in FIG. 5 to FIG. 8, in the stator 9, a ring-shaped (annular) front insulator 61 and a ring-shaped (annular) rear insulator 62, which are electrically insulating members, are assembled (joined) onto front and rear end surfaces, respectively, of a stator core 60, which is formed by laminating (stacking) a plurality of steel plates. In addition, coils 64 are respectively wound around six teeth 63 that protrude from an inner side of the stator core 60. Further, rotation-detection devices 66 (e.g., Hall effect sensors) are installed on a sensor-circuit board 65 and detect the positions of permanent magnets 68 provided on the rotor 10. The sensor-circuit board 65 is screw fastened onto a front surface of the front insulator 61.

Optionally, the sensor-circuit board 65 may include a temperature-detecting device that generates a temperature-detection signal, which is input to the controller 20. In such an embodiment, the controller 20 monitors the temperature-detection signal and stops the control (operation) of the brushless motor 8 at a prescribed (upper limit) temperature. In such an embodiment, damage caused by an excessive temperature of the brushless motor 8 of the 10.8 V hammer driver-drill 1 can be reliably prevented.

Referring again to FIGS. 3 and 4, the rotor 10 comprises: a substantially cylindrical rotor core 67, which is formed by laminating (stacking) a plurality of steel plates and is disposed around the rotary shaft 11. Four plate-shaped permanent magnets 68 (e.g., sintered magnets) are fixed to an inner part of the rotor core 67. The permanent magnets 68 are inserted into through holes, which are formed such that they are located, in a transverse cross-section of the rotor core 67, on four sides of a square centered on the rotary shaft 11, and are fixed by an adhesive and/or by press fitting.

A rear end of the rotary shaft 11 is axially supported by a bearing 69, which is held by a rear part of the housing 6. A centrifugal fan 70 is attached to the rotary shaft 11 at a position forward of the bearing 69. Air-exhaust ports 71 are formed in left and right side surfaces of the housing 6 proximal to the location of the centrifugal fan 70, and air-suction ports 72 are provided in side surfaces of the housing 6 that contact outer sides of the stator 9 (see FIG. 1).

A rear stopper 73 is provided between the rotor core 67 and the centrifugal fan 70. The rear stopper 73 is a brass disc and has an outer diameter the same as that of the rotor core 67; it is fastened to the rotary shaft 11 coaxially with the rotor core 67. A front stopper 74 is provided on an inner side of the sensor-circuit board 65 between the rotor core 67 and the bearing 31 on the front side. The front stopper 74 is also a brass disc, but has an outer diameter smaller than that of the rotor core 67; it is fastened to the rotary shaft 11 coaxially with the rotor core 67 and such that the front stopper 74 is spaced apart from the rotor core 67 with a gap in between. However, the outer diameter of the front stopper 74 is larger than that of an inner-side circle virtually defined by the positions of the four permanent magnets 68. Furthermore, the front stopper 74 is located forward of the permanent magnets 68.

The structure of the stator 9 will now be discussed in further detail. More particularly, the stator 9 is shown in FIG. 5 to FIG. 14 removed from the power tool and will be explained with the understanding that the front insulator 61 side is set upward and the rear insulator 62 side is set downward.

Six grooves 75 are formed in the axial direction, equispaced in the circumferential direction, on an outer circumference of the stator core 60. Mating pieces 76 are formed integrally with or on each of the front insulator 61 and the rear insulator 62 in the axial direction. The mating pieces 76 respectively mate with (are press-fitted into) end portions of the grooves 75. The press fitting of the mating pieces 76 into the grooves 75 makes it possible to resist warpage of the front and rear insulators 61, 62 and to rigidly integrate (connect) the stator core 60 with the front and rear insulators 61, 62. On both sides of one of the grooves 75 of the stator core 60, projections 77 are formed along the groove 75. The engagement of the projections 77 in a not-shown engaging groove, which is provided on an inner surface of the housing 6, makes it possible to rotationally lock the stator 9 and to position the stator 9 forward and rearward. In addition, along an extension of the projections 77 on a side surface of the front insulator 61, latching recessed parts 78, 78 are provided in which not-shown projections, which are provided on the inner surface of the housing 6, are latched, thereby making it possible to rotationally lock the stator 9 and to position the stator 9 in the front-rear direction. However, instead of forming both the projections 77 and the latching recessed parts 78, either one alone may be formed. In addition, the present teachings are not limited to embodiments in which both the rotational locking of the stator 9 and the forward-rearward positioning of the stator 9 are effected, and the present teachings encompass embodiments in which either the rotational locking or the forward-rearward positioning alone is effected.

Six slots 79 are respectively formed between circumferentially adjacent pairs of teeth 63. On the outer sides of three of the slots 79, which are adjacent in a semicircular portion (area in plan view) of the front insulator 61, three upward-protruding retaining parts 82 are provided to respectively hold three fusing terminals (electrical connection terminals) 81. Each fusing terminal 81 electrically connects (fuses) a wire 101 of each pair of the coils 64 for one phase with a respective power-supply line 80 for the corresponding phase. In the retaining parts 82, a pair of projections 83, which forms a U shape in a plan view, is sequentially arranged in a circumferential direction of the front insulator 61 and such that the projections 83 are oriented opposing one another. The projections 83 are provided such that they extend to a height that protrudes farther upward than a ring-shaped (annular) upper-end surface 61a of the front insulator 61. Between three of the retaining parts 82, L-shaped (in side view) hooks 84 for holding the power-supply lines 80 are provided such that they protrude from the outer sides of the teeth 63.

In addition, on the outer side of the tooth 63 that is located between the retaining parts 82 and on the outer sides of the two teeth 63 that are located two teeth away from said tooth 63 in the circumferential directions (i.e., at vertex positions of a regular triangle), three screw bosses 85 for screw fastening the sensor-circuit board 65 are provided such that they are lower than the retaining parts 82 and extend to a height that protrudes farther upward than the upper-end surface 61a of the front insulator 61. Stepped bosses 86A, 86B, which have receiving surfaces 87 of a height the same as that of the screw bosses 85 and wherein are provided bosses 88A, 88B that protrude farther upward than the receiving surfaces 87, are provided such that they protrude from the outer sides of the teeth 63 located between the screw bosses 85. The boss 88A of the stepped boss 86A is disposed along a concentric circle that is slightly smaller than the concentric circle of the screw bosses 85, and the diameter of the boss 88B is smaller than that of the boss 88A.

On the rear insulator 62, insulating ribs 89 are disposed along the circumferential direction and are uprightly (perpendicularly) provided on the outer sides of the slots 79.

In the sensor-circuit board 65, six notched parts (notches) 91, which are curved toward a through hole 90 for the rotary shaft 11 provided at the center of the sensor-circuit board 65, are formed equispaced in the circumferential direction. Six fixing pieces 92, which serve as fixing parts that protrude in radial directions, are formed equispaced in the circumferential direction. Each fixing piece 92 is formed between a circumferentially-adjacent pair of notched parts 91. Furthermore, each notched part 91 extends beyond an inner circumference of the stator core 60 and curves to a location that overlaps its corresponding slot 79 in plan view. In addition, a tip of each fixing piece 92 extends slightly beyond an outer circumference of the stator core 60. Two adjacent fixing pieces 92 (hereinbelow indicated as 92A, 92B when they are distinguished) are formed longer than the other four fixing pieces 92.

Figure 6:
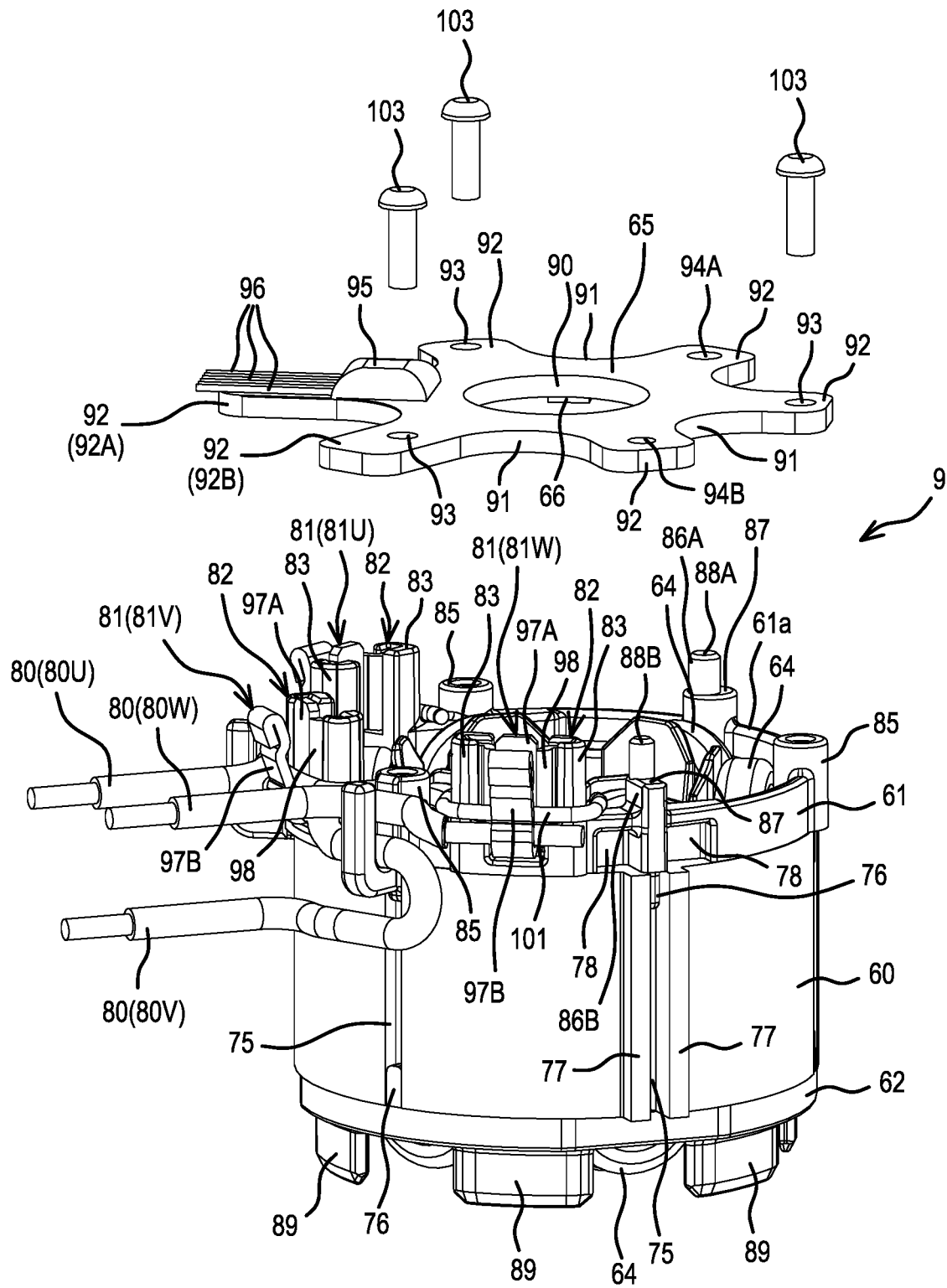
FIG. 6 is an exploded oblique view of the stator, wherein a sensor-circuit board has been removed.
Figure 7:
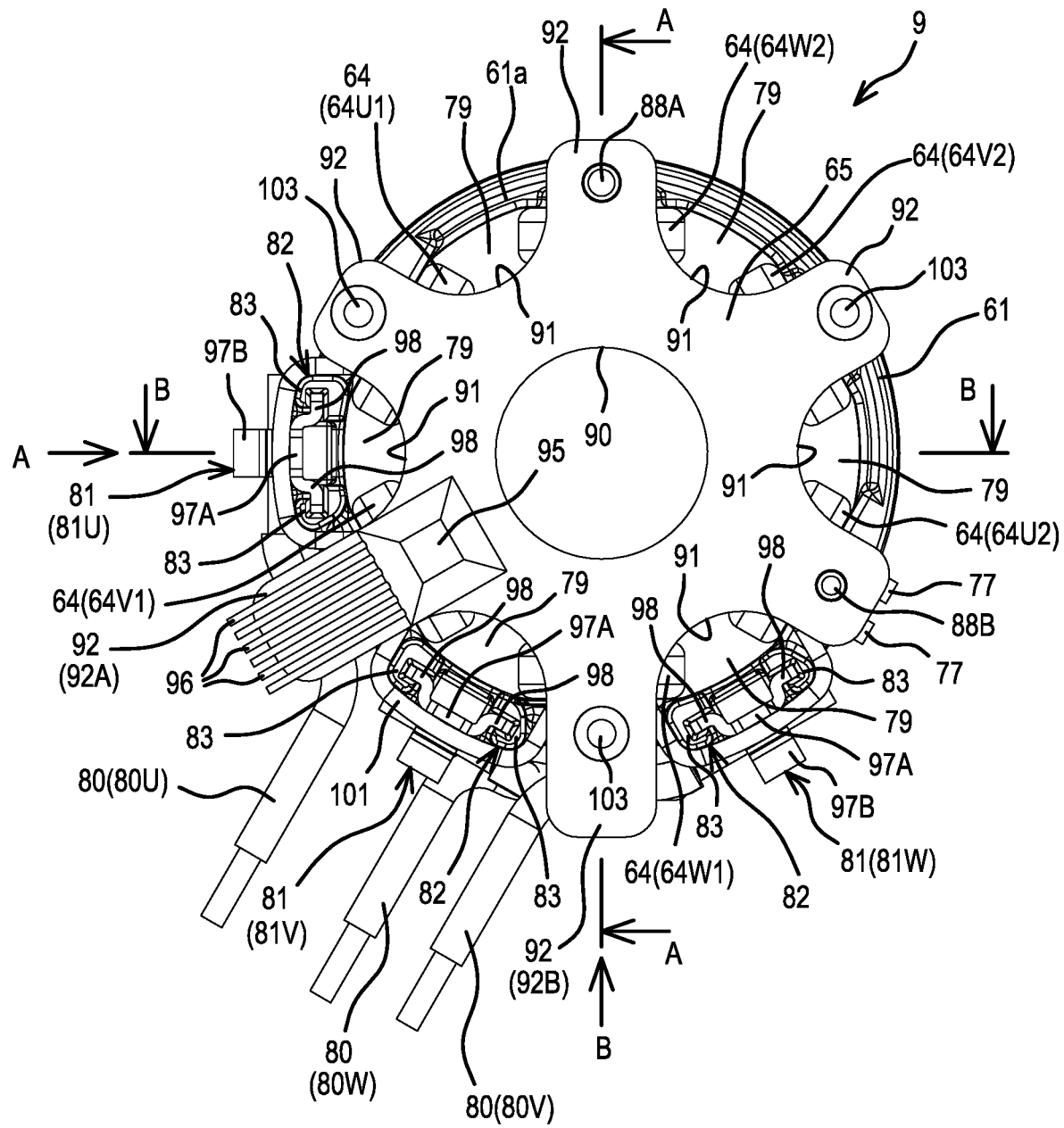
FIG. 7 is a plan view of the stator.
Figure 8:
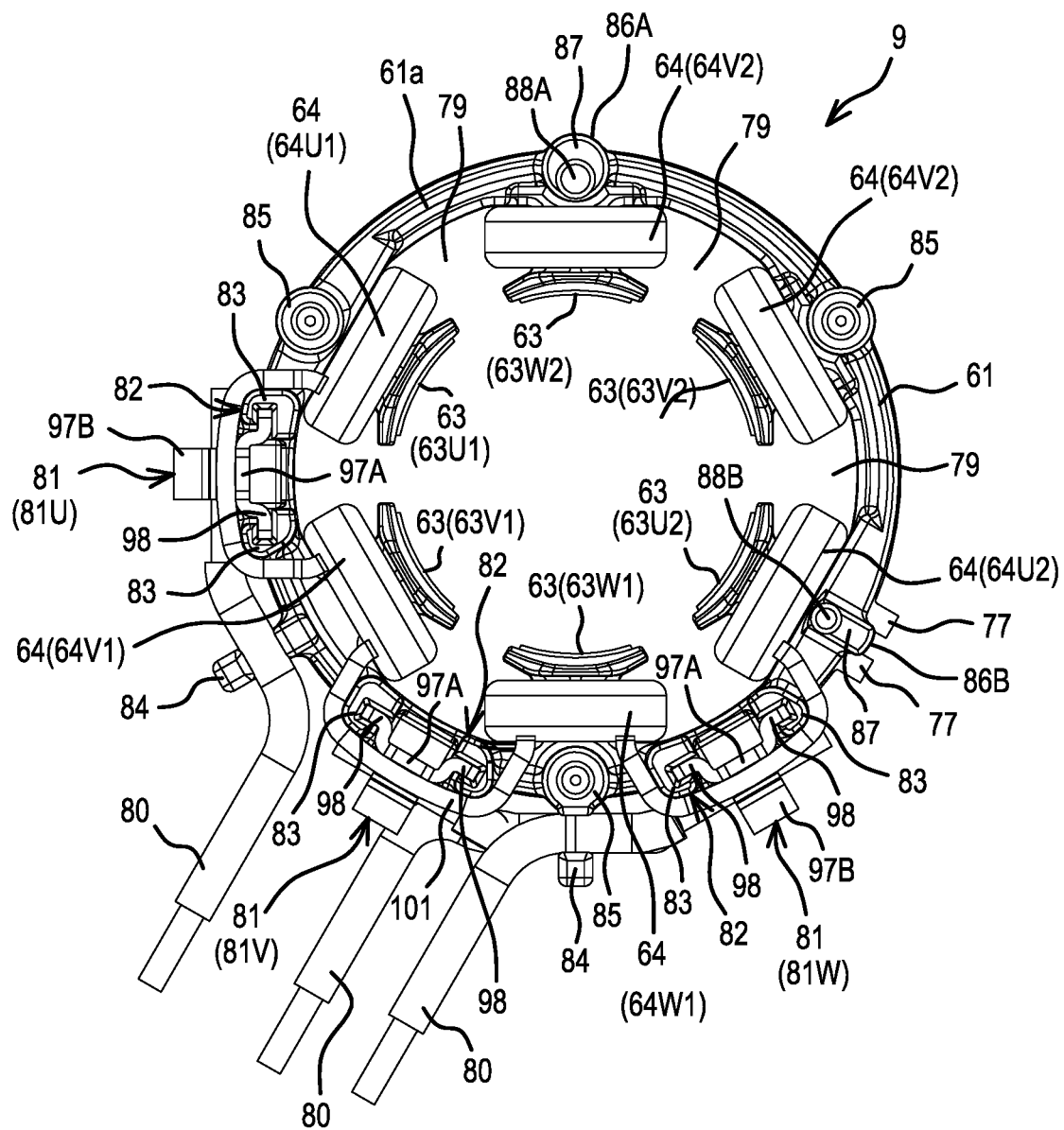
FIG. 8 is a plan view of the stator, wherein the sensor-circuit board has been removed.
Figure 9:
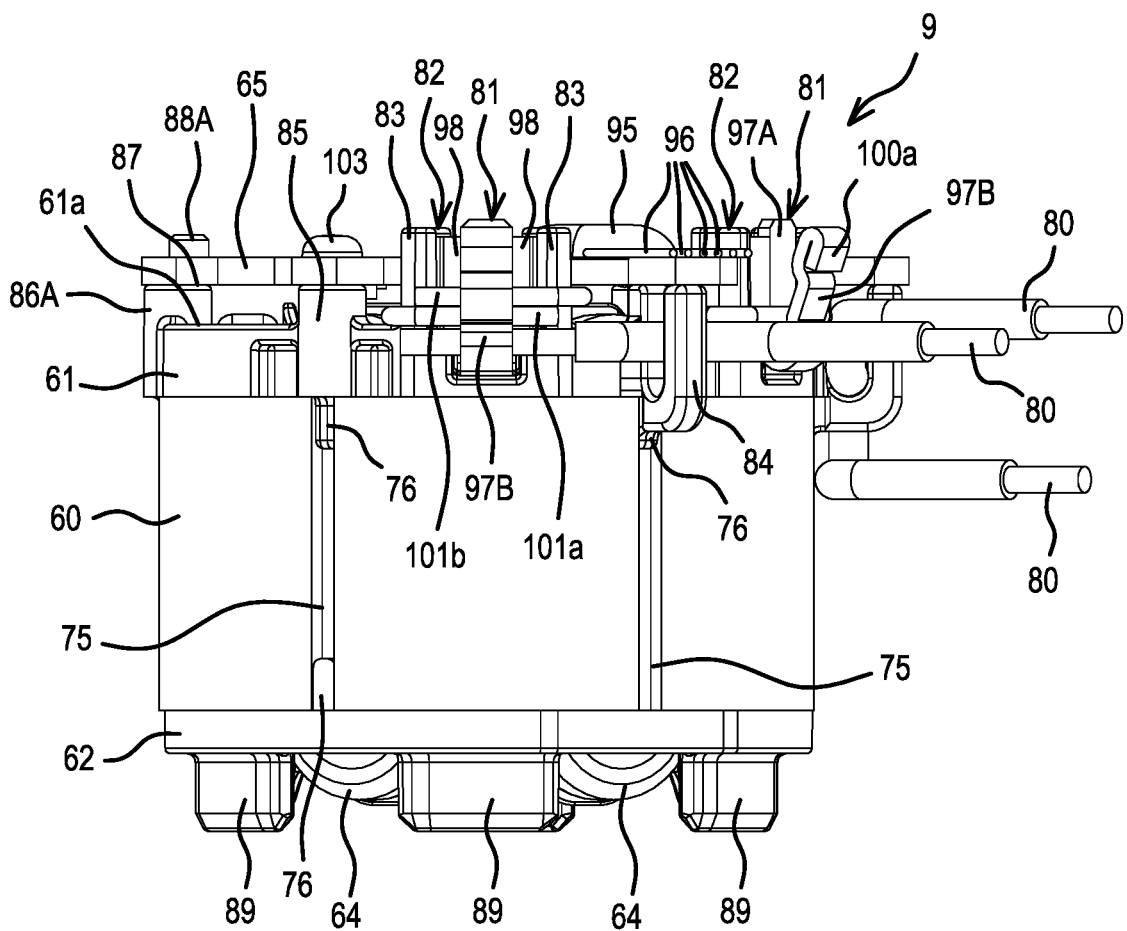
FIG. 9 is a view in the direction of the arrow A that is shown on the left side in FIG. 7.
Figure 10:
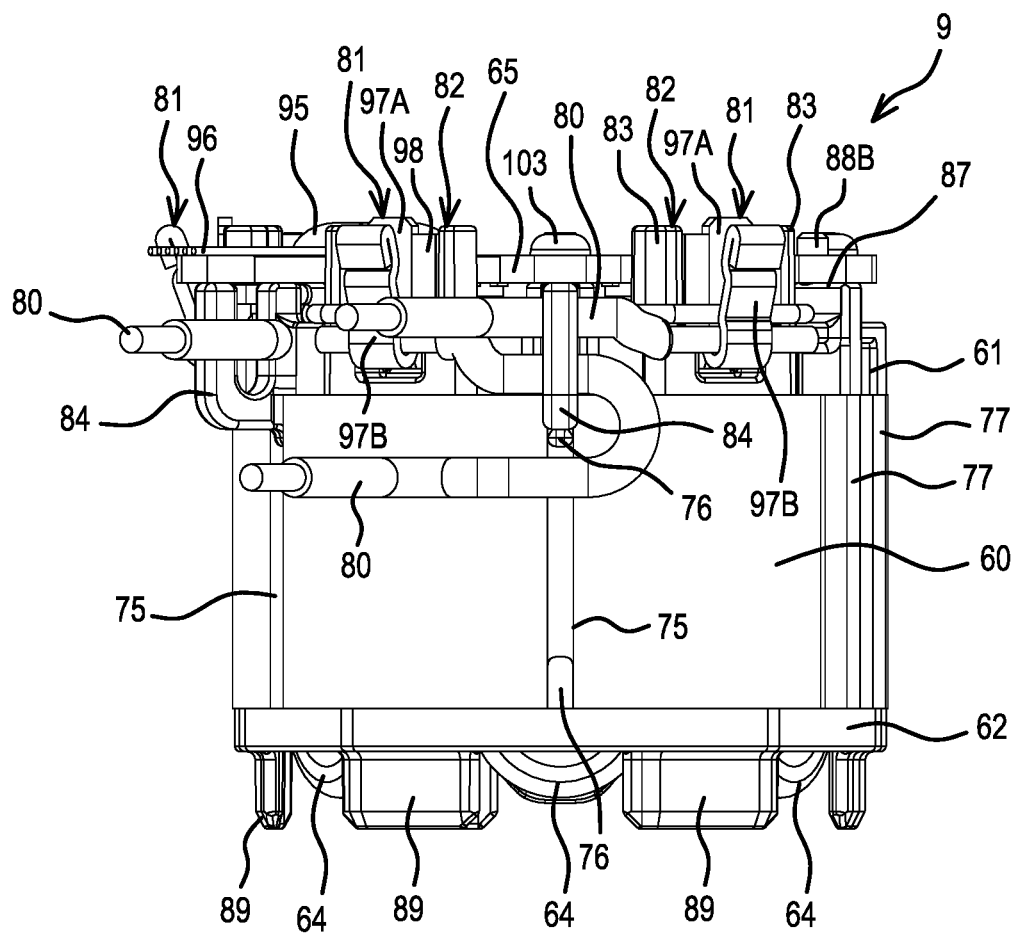
FIG. 10 is a view in the direction of the arrow B that is shown at the bottom in FIG. 7.
Figure 11:
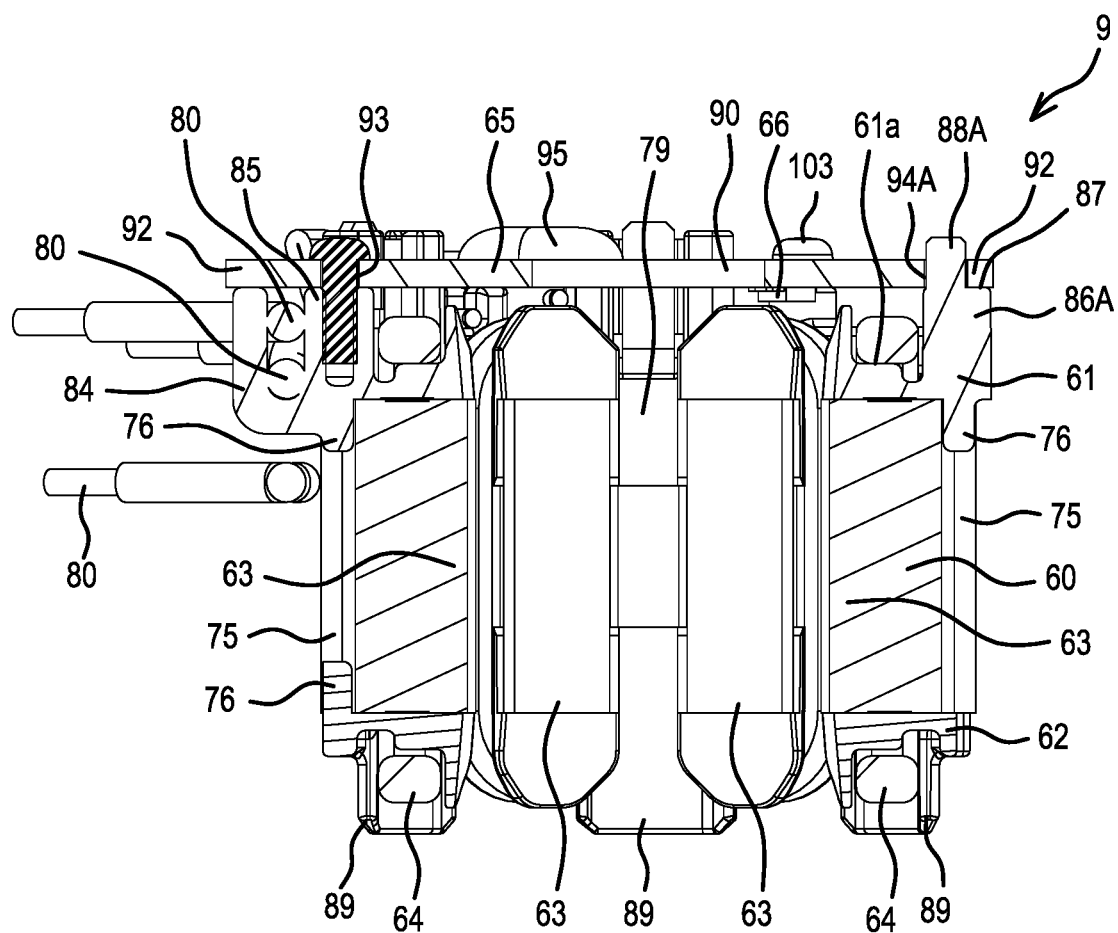
FIG. 11 is a cross-sectional view taken along (vertical) line A-A shown in FIG. 7.
Figure 12:
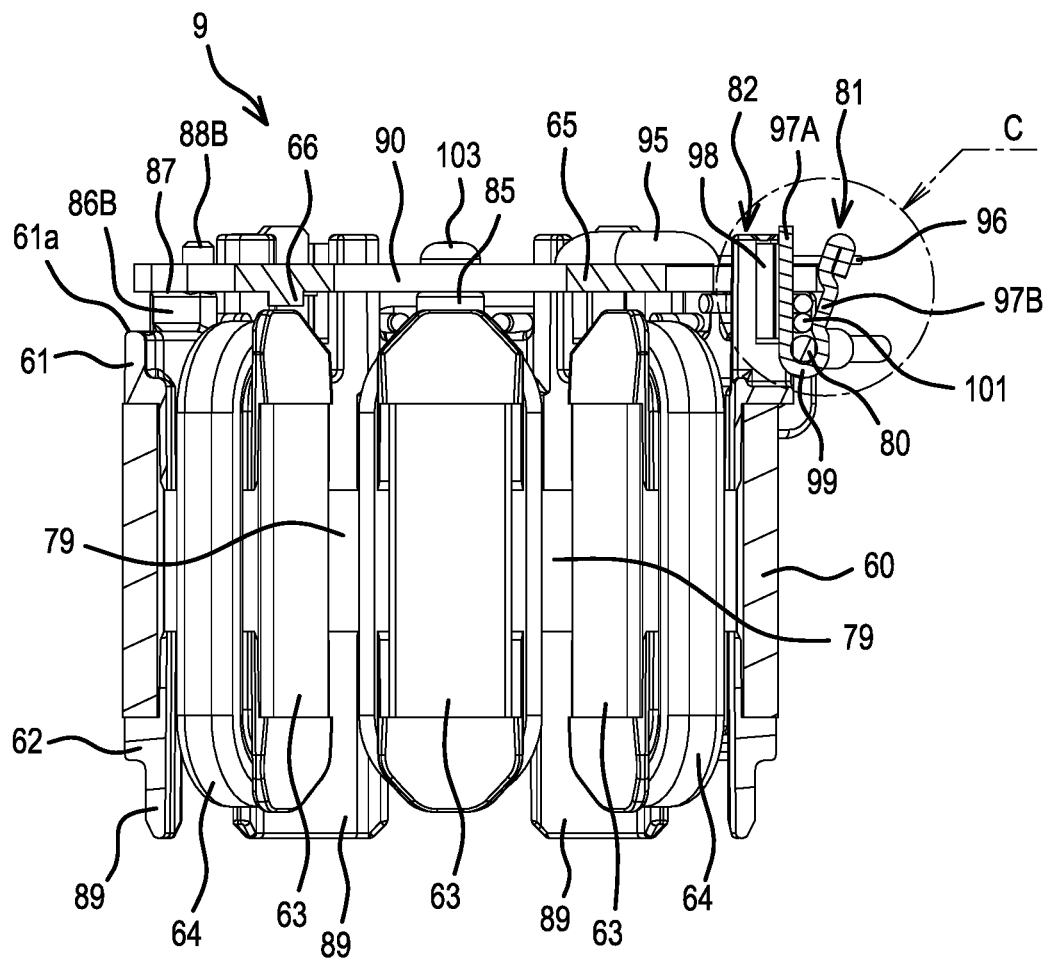
FIG. 12 is a cross-sectional view taken along (horizontal) line B-B shown in FIG. 7.

Threaded holes 93 corresponding to the screw bosses 85 are formed in the three fixing pieces 92 that are located at the vertices of a regular triangle that includes the one long fixing piece 92B (see e.g., FIG. 6). A first positioning hole 94A, which corresponds to the boss 88A of the stepped boss 86A, and a second positioning hole 94B, which corresponds to the boss 88B of the stepped boss 86B, are formed in two of the other fixing pieces 92, which are located between the three fixing pieces 92 in which the threaded holes 93 are formed. A connection part 95 for six lead wires 96, which respectively output detection signals generated by the three rotation-detection devices 66, is provided on an upper surface of the remaining one fixing piece 92A. The three rotation-detection devices 66 are disposed at a prescribed spacing around the through hole 90 on a lower surface of the sensor-circuit board 65.

Figure 13:
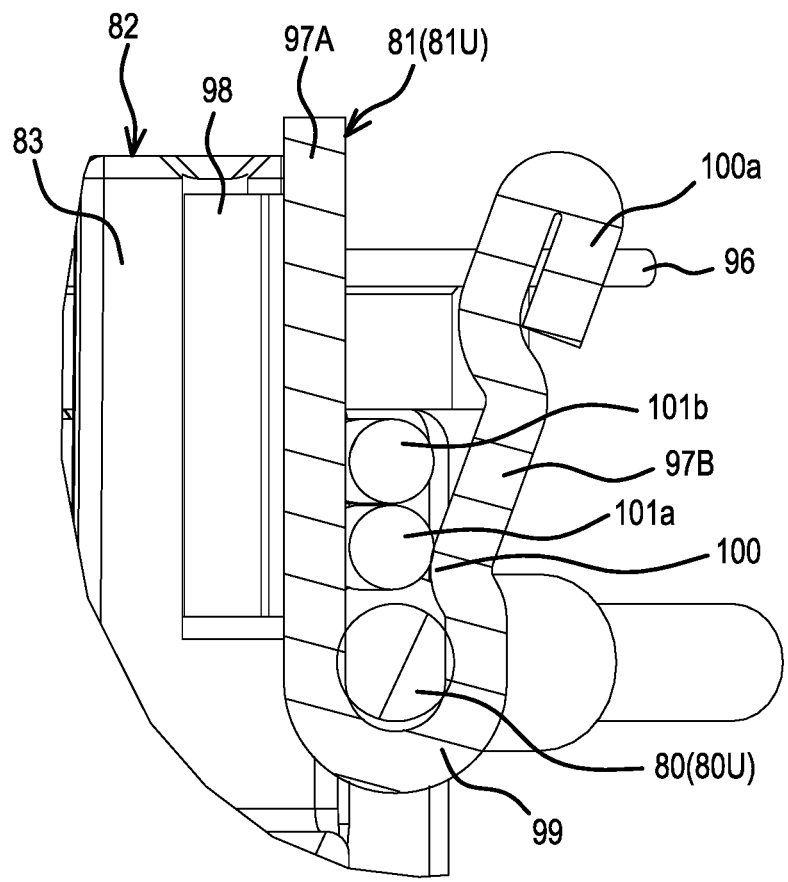
FIG. 13 is an enlarged view of section (encircled portion) C shown in FIG. 12.
Figure 14:
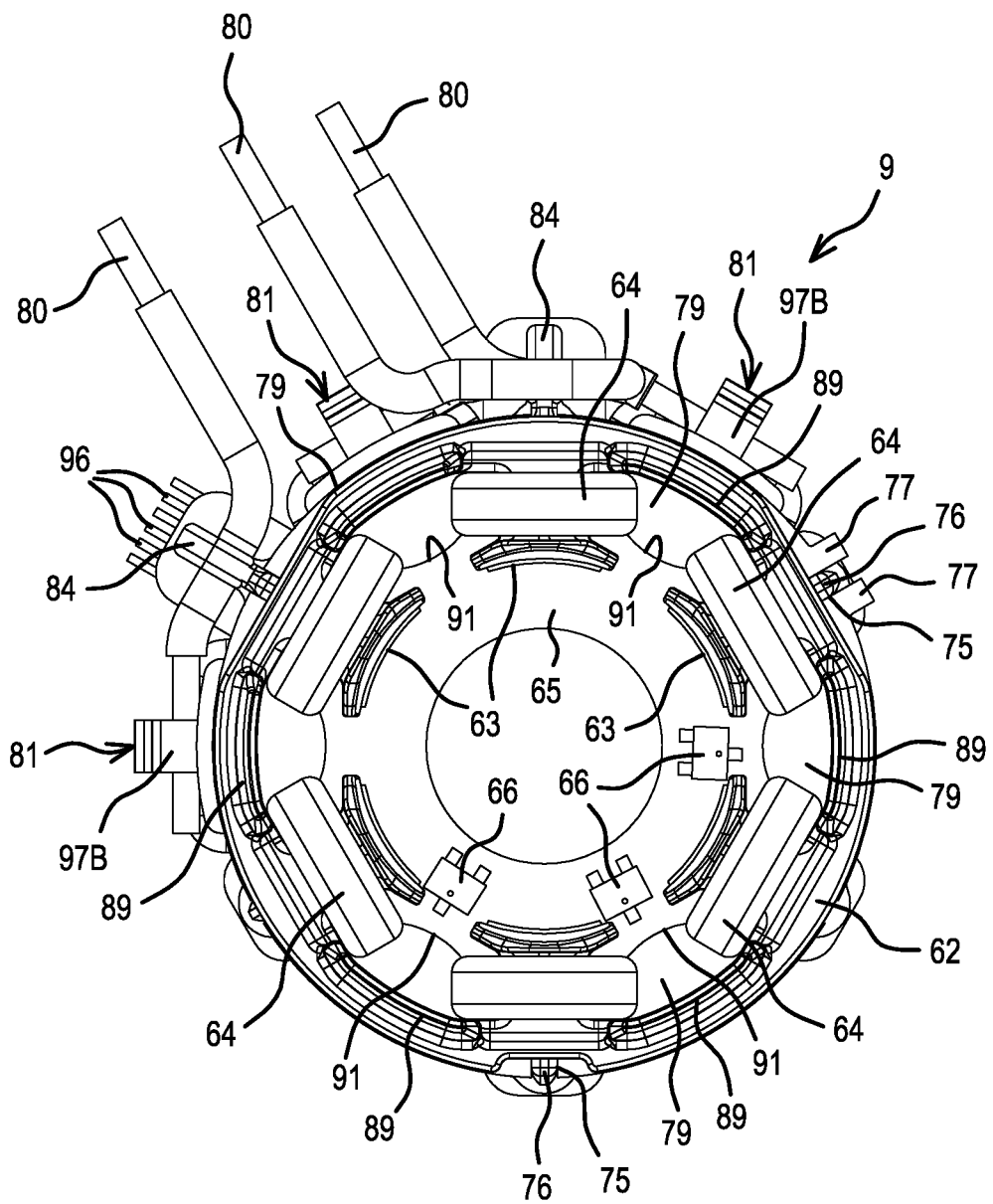
FIG. 14 is a bottom view of the stator.

Each fusing terminal 81 is made by folding a strip-shaped metal plate in two, thereby forming L-shaped wing pieces 98, 98 on both sides of one plate part 97A. Then, a tip of another plate part 97B is folded toward the outer side. With the double-folded portion set downward, the wing pieces 98 are respectively inserted, from above, into the two projections 83 of the corresponding retaining part 82, and thereby the fusing terminal 81 is held with an attitude such that the plate part 97B is located on the outer side and a V shape is open upward. As shown in FIG. 13, a curled part 99, in which the power-supply lines 80 fit, is formed on an inner side of the double-folded portion; on an upper side thereof, a bent part 100 is formed in which the wire 101 of the coils 64 is pinched by the plate part 97B. A folded-back portion 100a is formed at an upper, outer side end of the plate portion 97B. Thus, the fusing terminals 81 are disposed such that they are gathered, by the retaining parts 82, on one semicircular side (in one semicircular area) of the stator 9 in plan view.

In the present embodiment, the six coils 64 are formed by sequentially winding one (i.e. a single continuous) wire 101 around every tooth 63, and then two coils 64 of each phase are connected to a respective fusing terminal 81. Furthermore, crossover wires 102 (i.e. crossover wires 102U, 102V, 102W), each of which interconnects the coils 64 of one phase that are located diagonally opposite one another, are wired (disposed) on the rear insulator 62 side and not on the front insulator 61 side. Various coil-winding methods are explained below, wherein, if there is a need to distinguish the three phases of U, V, and W, then the letters U, V, and W are appended to the reference numbers of the constituent parts, and the numerals 63U1, 63U2, 64U1, 64U2 and the like are further appended if the teeth 63, the coils 64, and the like, which form pairs for each phase, are distinguished.

FIG. 15 includes two schematic drawings that show a winding method, wherein FIG. 15A is the wiring-connection side (the front insulator 61 side) and FIG. 15B is the opposite wiring-connection side (the rear insulator 62 side). Reference numbers 81U, 81V, 81W are the fusing terminals. The circled-plus symbols indicate wires wound on the far side orthogonal to the paper surface, and the circled black-dot symbols indicate wires wound on the near side orthogonal to the paper surface. In addition, the following explanation of the wiring-connection side and the opposite wiring-connection side assumes that the counterclockwise direction is left and the clockwise direction is right.

First, a start end 101a is temporarily fixed, on the wiring-connection side, to the fusing terminal 81U, whereto a U-phase power-supply line 80U has been temporarily fixed. Then, the coil 64U1 is formed by winding from the right side around the tooth 63U1, which is located on the left side of the fusing terminal 81U, and then led out, on the opposite wiring-connection side, on the left side of the tooth 63U1; a crossover wire 102U, shown by a solid-lined arrow, is pulled clockwise around on the outer sides of the insulating ribs 89 as a substantially semicircular portion, after which the coil 64U2 is formed by winding from the right side around the diagonally-opposite tooth 63U2. Furthermore, the wire 101 is led out, on the wiring-connection side, from the left side of the tooth 63U2 and is temporarily fixed to the fusing terminal 81W, whereto a W-phase power-supply line 80W has been temporarily fixed.

Next, a coil 64W1 is formed by winding from the right side around a tooth 63W1, which is adjacent to the left side of the fusing terminal 81W. Then, it is led out, on the opposite wiring-connection side, on the left side of the tooth 63W1; a crossover wire 102W, which is shown by a dotted line, is pulled clockwise around on the outer sides of the insulating ribs 89 as a substantially semicircular portion, after which a coil 64W2 is formed by winding from the right side around the diagonally-opposite tooth 63W2. Subsequently, it is led out, on the same opposite wiring-connection side, on the left side of the tooth 63W2; the crossover wire 102W is pulled clockwise around on the outer sides of the insulating ribs 89 as a substantially semicircular portion and subsequently led out, on the wiring-connection side, on the left side of the diagonally-opposite tooth 63W1 and is temporarily fixed to the fusing terminal 81V, whereto a V-phase power-supply line 80V has been temporarily fixed. That is, the wire 101 that forms the W-phase coils 64W1, 64W2 is wired, a substantially semicircular portion at a time, on the rear insulator 62 side clockwise between the diagonally-opposite teeth 63W1, 63W2.

Next, a coil 64V1 is formed by winding from the right side around a tooth 63V1, which is adjacent to the left side of the fusing terminal 81V. Then, it is led out, on the opposite wiring-connection side, on the left side of the tooth 63V1; a crossover wire 102V, shown by a chain line, is pulled clockwise around on the outer sides of the insulating ribs 89 as a substantially semicircular portion, after which the coil 64V2 is formed by winding from the right side around the diagonally-opposite tooth 63V2. Subsequently, it is led out, on the same opposite wiring-connection side, on the left side of the tooth 63V2; the crossover wire 102V is pulled clockwise around on the outer sides of the insulating ribs 89 as a substantially semicircular portion and is subsequently led out, on the wiring-connection side, on the left side of the diagonally-opposite tooth 63V1; a terminal end 101b is temporarily fixed to the fusing terminal 81U, which is adjacent to the left side of the tooth 63V1. That is, the wire 101 that forms the V-phase coils 64V1, 64V2 also is wired, a substantially semicircular portion at a time, on the rear insulator 62 side counterclockwise between the diagonally-opposite teeth 63V1, 63V2.

Lastly, when the power-supply lines 80 and the wire 101 are electrically connected (fused) at each of the respective fusing terminals 81, the stator 9 is obtained wherein the coils 64 of each phase are delta connected.

After the wiring connection has been completed in this manner, in the sensor-circuit board 65, the three fixing pieces 92, in which the threaded holes 93 are formed, are aligned with the three screw bosses 85. Then, the first positioning hole 94A is inserted into the boss 88A of the stepped boss 86A and the second positioning hole 94B is inserted into the boss 88B of the stepped boss 86B. Thereafter, the fixing pieces 92 are fixed to the screw bosses 85 by screws 103, whereupon the sensor-circuit board 65 is supported, orthogonal to the axis line of the stator 9 and at a location upward of the upper-end surface 61a of the front insulator 61, by the upper surfaces of the screw bosses 85 and the receiving surfaces 87 of the stepped bosses 86A, 86B. At this time, the tips of the hooks 84, too, make contact with the lower surfaces of the long fixing pieces 92A, 92B, thereby supporting these fixing pieces 92A, 92B. In this embodiment, the crossover wires 102 between the coils 64 of each phase are wired on the opposite wiring-connection side, and therefore a sufficient gap is formed (provided) between the front insulator 61 and the sensor-circuit board 65. In addition, in the state wherein the sensor-circuit board 65 is fixed, the retaining parts 82 and fusing terminals 81 pass through the notched parts (notches) 91 of the sensor-circuit board 65 and protrude upward from the sensor-circuit board 65. Furthermore, the slots 79 between each of the teeth 63 in plan view are exposed to (fluidly communicate with) the interiors of the notched parts (notches) 91 of the sensor-circuit board 65 (see e.g., FIG. 7).

Because the power-supply lines 80 are held by the hooks 84 and the fixing pieces 92, the power-supply lines 80 tend not to move and also become guides during the wiring. In addition, because the fixing piece 92A, to which the lead wires 96 of the rotation-detection devices 66 are connected, is supported by one of the hooks 84, the lead wires 96 tend not to disconnect. Furthermore, because the distance in a radial direction from the axial center of the brushless motor 8 to the center of the boss 88A is less (smaller) than the distance in the radial direction from that axial center to the centers of the screws 103, vibration of the sensor-circuit board 65 during operation is inhibited.

In the stator 9, the fusing terminals 81 are incorporated into the housing 6 at phases (intervals) located on a lower-half side (within a semicircular (180°) arc) of the stator 9. Consequently, the power-supply line 80 of each phase connected to its corresponding fusing terminal 81 is wired via the shortest distance to the controller 20 side without passing through the left and right outer sides of the stator 9. As a result, this wiring scheme does not require an increase of the size of the housing 6 in the radial direction, thereby making it possible to reduce the size of the housing 6 (make it more compact) and to make do with a short length of wiring.

In the hammer driver-drill 1 configured as described above, when the switch 14 is turned ON by squeezing the trigger 15, the microcontroller of the controller 20 acquires the rotational state of the rotor 10 by receiving rotation-detection signals, which are output from the rotation-detection devices 66 of the sensor-circuit board 65, that indicate the positions of the permanent magnets 68 of the rotor 10, controls the ON/OFF state of the switching devices in accordance with the acquired rotational state, and rotates the rotor 10 by sequentially supplying electric current to the coils 64 of each phase of the stator 9. Consequently, the rotary shaft 11 rotates, which rotates the spindle 13 via the planetary-gear speed-reducing mechanism 33; thus, usage in the operation mode selected for the particular tool accessory (tip tool) chucked (held) by the drill chuck 4 becomes possible.

When the centrifugal fan 70 rotates together with the rotation of the rotary shaft 11, outside air is sucked in via the air-suction ports 72 on the side surfaces of the housing 6, passes over the outer side of the stator 9 and the inner side (within the interior) of the stator 9 (between the stator 9 and the rotor 10), and is discharged via the air-exhaust ports 71, thereby cooling the brushless motor 8. As was described above, in the stator 9, the slots 79 are exposed, in a side view, by the notched parts (notches) 91 of the sensor-circuit board 65. Furthermore, because the crossover wires 102 are not wired between the sensor-circuit board 65 and the front insulator 61, the air that passes through the inner side of the stator 9 can pass smoothly through the slots 79 on both sides of the coils 64 without being hindered by the sensor-circuit board 65. Consequently, each of the coils 64 is effectively cooled. In addition, because the fusing terminals 81 are located between the fixing pieces 92, 92, the fusing terminals 81 are also effectively cooled by the air that passes through the notched parts (notches) 91.

Moreover, in the rotor 10, the front stopper 74 and the rear stopper 73 are provided at the front and rear, respectively, and consequently movement of the permanent magnets 68 in the front-rear direction is restricted or prevented and the permanent magnets 68 are effectively prevented from coming off of the rotor core 67.

Thus, according to the hammer driver-drill 1 of the above-described embodiment, the notched parts 91, which are located between adjacent teeth 63 in the axial direction of the stator 9, are formed on the outer circumference of the sensor-circuit board 65. Therefore the air for cooling the brushless motor 8 easily passes through the inner side (interior) of the stator 9. As a result, the coils 64 of the stator 9 can be effectively cooled.

More particularly, because the notched parts 91 are respectively formed between the fixing pieces 92, 92, the notched parts 91 can be provided without interfering with the attachment of the sensor-circuit board 65.

In addition, by disposing the connection part 95 that holds the lead wires 96 on the sensor-circuit board 65 between two of the notched parts 91, even though the notched parts 91 are formed (present), they do not interfere with the connection of the lead wires 96.

Furthermore, because the fusing terminals 81 connected to the coils 64 are respectively disposed in the notched parts 91, the fusing terminals 81 can also be effectively cooled.

In addition, there are six of the coils 64, the notched parts 91 are formed at six locations, and the notched parts 91 respectively expose the coils 64 in the axial direction of the stator 9, which makes it possible to reliably cool each of the coils 64 of the three phases.

Furthermore, according to the hammer driver-drill 1 of the above-described embodiment, the fusing terminals 81, which are connected to the coils 64 and connected to the power-supply lines 80, are provided on the front insulator 61, which is a first electrically insulating member whereon the sensor-circuit board 65 is fixed on the outer-circumference side. Therefore the sensor-circuit board 65 can be easily detached from the stator 9.

More particularly, because the sensor-circuit board 65 is screw-fastened onto the front insulator 61, the mounting and dismounting of the sensor-circuit board 65 can be performed simply.

In addition, because three of the fusing terminals 81 are provided and the coils 64 are delta connected, the wiring of the coils 64 of the three phases can be performed easily.

Furthermore, because the fusing terminals 81 are disposed between adjacent teeth 63, the wiring connection of the wire 101 of the coils 64 wound on the teeth 63 can be performed easily.

In addition, because the connection part 95 that holds the lead wires 96 is disposed between two of the fusing terminals 81, the lead wires 96 can be routed without interfering with the fusing terminals 81.

Moreover, according to the hammer driver-drill 1 of the above-described embodiment, the grooves 75 are provided, along the axial direction of the stator 9, at (on) the outer circumference of the stator core 60, and the mating pieces 76, which mate with the grooves 75, are formed integrally with the front and rear insulators 61, 62. Therefore the stator core 60 and the front and rear insulators 61, 62 can be rigidly integrated (connected) and in a manner that resists or inhibits warpage of the front and rear insulators 61, 62 over time.

Furthermore, according to the hammer driver-drill 1 of the above-described embodiment, the three fusing terminals 81 are disposed within a semicircular-portion area of the stator core 60, and therefore the wiring space for the power-supply lines 80 is reduced. Moreover, the routing of the power-supply lines 80 also becomes easy and is shortened. Consequently, the housing 6 can be made more compact.

In addition, because a portion of the crossover wires 102 of the wire 101 forming the coils 64 of each phase is provided on the opposite wiring-connection side (the rear insulator 62 side), the space on the wiring-connection side (the front insulator 61 side) expands. This increases the number of degrees of freedom for the wire routing and the like, and moreover there is no longer a need to provide the fusing terminals 81 with electrically-insulating parts on the wiring-connection side.

It is explicitly noted that the numbers of the notched parts and the fixing pieces are not limited to the above-described embodiment and can be increased or decreased as appropriate. Moreover, the number of screw bosses, stepped bosses, and the like also can be modified as appropriate in accordance with the number of the screw fittings. The stepped bosses may be omitted. The notched parts are not limited to the bent (curved) shape shown in the drawings and instead may be notched into the shape of a quadrangle, a trapezoid, a triangle, a semicircle, or the like.

In addition, it is not necessary to provide the notched parts in correspondence with all of the slots, and it is possible to provide fewer of the notched parts than there are slots, as long as the cooling effect of the coils produced by the passage of the air is obtained. Accordingly, it is also conceivable to provide the notched parts such that they expose a plurality of slots and to dispose two or more of fusing terminals within one notched part.

Furthermore, in the above-described embodiment, the sensor-circuit board is provided on the front insulator, but it is also possible to provide the sensor-circuit board on the rear insulator and to wire (dispose) the crossover wires on the front insulator side.

Furthermore, wire-winding methods according to the present teachings are not limited to the method described in connection with FIG. 15 and can be modified as appropriate.

A variety of modified examples will be explained below, with reference to the schematic drawings. Furthermore, in the schematic drawings, too, the "A" portion of the Figure shows the wiring-connection side (the front insulator 61 side) and the "B" portion of the Figure shows the opposite wiring-connection side (the rear insulator 62 side), and constituent parts the same as those in FIG. 15 are assigned the same reference numbers, and redundant explanations are omitted.

Figure 16B:
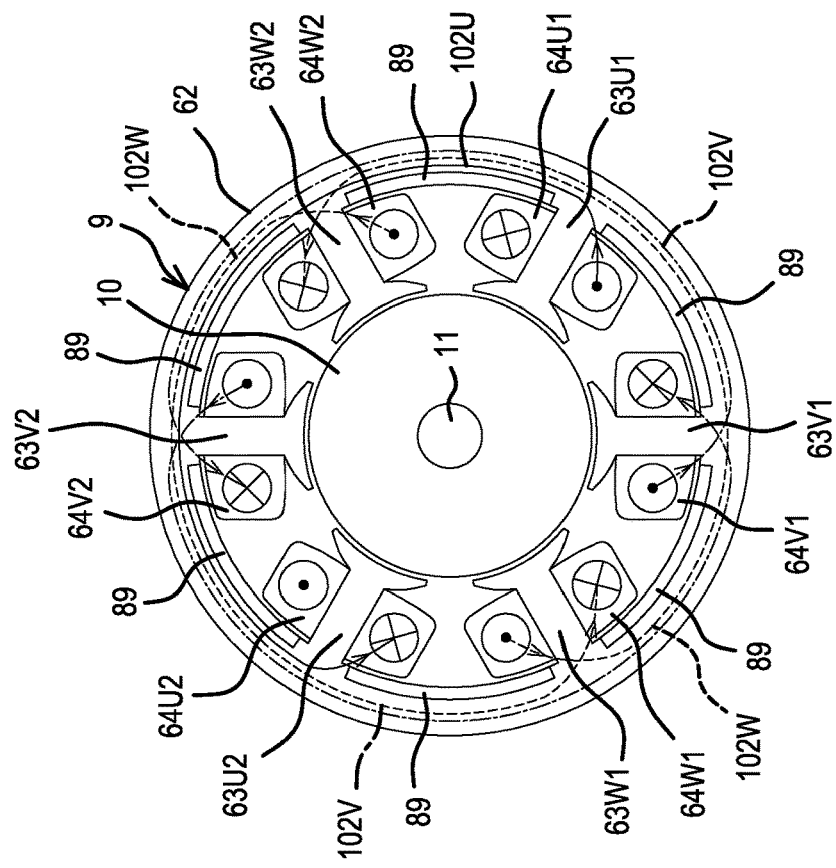
Figure 16A:
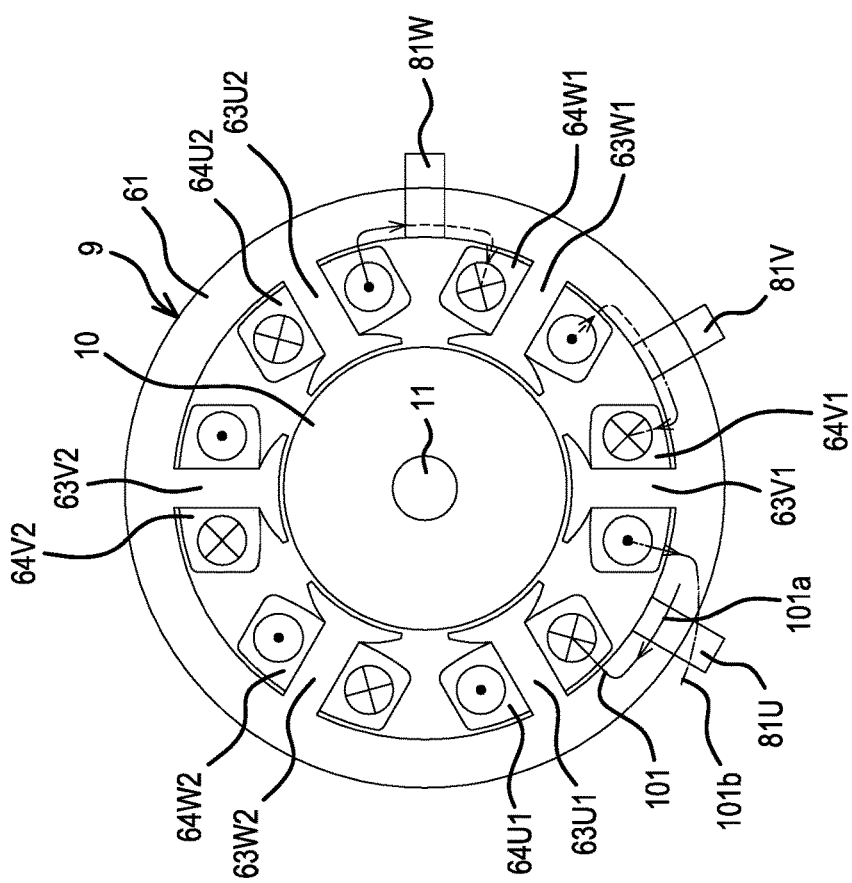

In the modified example shown in FIG. 16, first, the start end 101*a* is temporarily fixed on the wiring-connection side to the fusing terminal 81U, whereto the U-phase power-supply line 80U has been temporarily fixed. Then, the coil 64U1 is formed by winding from the right side around the tooth 63U1, which is located on the left side of the fusing terminal 81U, and is then led out, on the opposite wiring-connection side, on the left side of the tooth 63U1; the crossover wire 102U is pulled counterclockwise around on the outer sides of the insulating ribs 89 as a substantially semicircular portion, after which the coil 64U2 is formed by winding from the right side around the diagonally-opposite tooth 63U2. Furthermore, the wire 101 is led out, on the wiring-connection side, from the left side of the tooth 63U2 and is temporarily fixed to the fusing terminal 81W, whereto the W-phase power-supply line 80W has been temporarily fixed.

Next, the coil 64W1 is formed by winding from the right side around the tooth 63W1, which is adjacent to the left side of the fusing terminal 81W. Then, it is led out, on the opposite wiring-connection side, on the left side of the tooth 63W1; the crossover wire 102W is pulled counterclockwise around on the outer sides of the insulating ribs 89 as a substantially semicircular portion, after which the coil 64W2 is formed by winding from the right side around the diagonally-opposite tooth 63W2. Subsequently, it is led out, on the same opposite wiring-connection side, on the left side of the tooth 63W2; the crossover wire 102W is pulled counterclockwise around on the outer sides of the insulating ribs 89 as a substantially semicircular portion, after which it is led out, on the wiring-connection side, on the left side of the diagonally-opposite tooth 63W1 and is temporarily fixed to the fusing terminal 81V, whereto the V-phase power-supply line 80V has been temporarily fixed. That is, the wire 101 that forms the W-phase coils 64W1, 64W2 is wired, a substantially semicircular portion at a time, on the rear insulator 62 side counterclockwise between the teeth 63W1, 63W2, and the crossover wires 102W, 102W cross one another at the teeth 63W1, 63W2.

Next, the coil 64V1 is formed by winding from the right side around the tooth 63V1, which is adjacent to the left side of the fusing terminal 81V. Then, it is led out, on the opposite wiring-connection side, on the left side of the tooth 63V1; the crossover wire 102V is pulled counterclockwise around on the outer sides of the insulating ribs 89 as a substantially semicircular portion, after which the coil 64V2 is formed by winding from the right side around the diagonally-opposite tooth 63V2. Subsequently, it is led out, on the same opposite wiring-connection side, on the left side of the tooth 63V2; the crossover wire 102V is pulled counterclockwise around on the outer sides of the insulating ribs 89 as a substantially semicircular portion, then led out, on the wiring-connection side, on the left side of the diagonally-opposite tooth 63V1, and the terminal end 101*b* is temporarily fixed to the fusing terminal 81U, which is adjacent to the left side of the tooth 63V1. That is, the wire 101 that forms the V-phase coils 64V1, 64V2 also is wired, a substantially semicircular portion at a time, on the rear insulator 62 side counterclockwise between the teeth 63V1, 63V2. Because the crossover wires 102V, 102V cross one another at the teeth 63V1, 63V2, a maximum of four of the crossover wires 102 overlap.

Figure 17B:
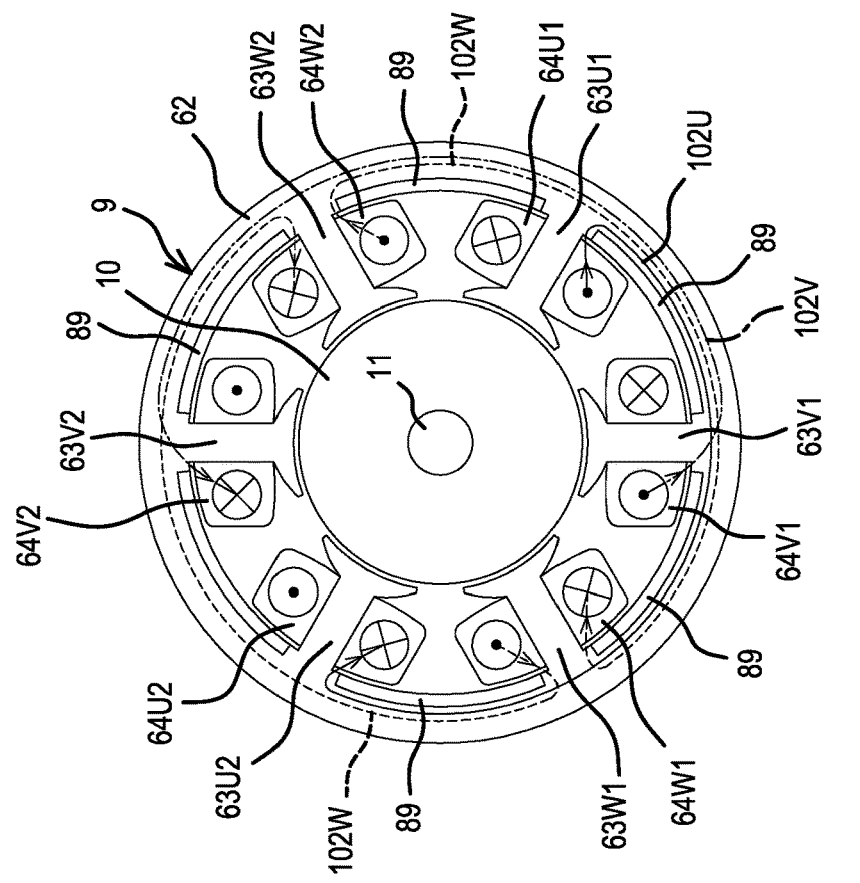
Figure 17A:
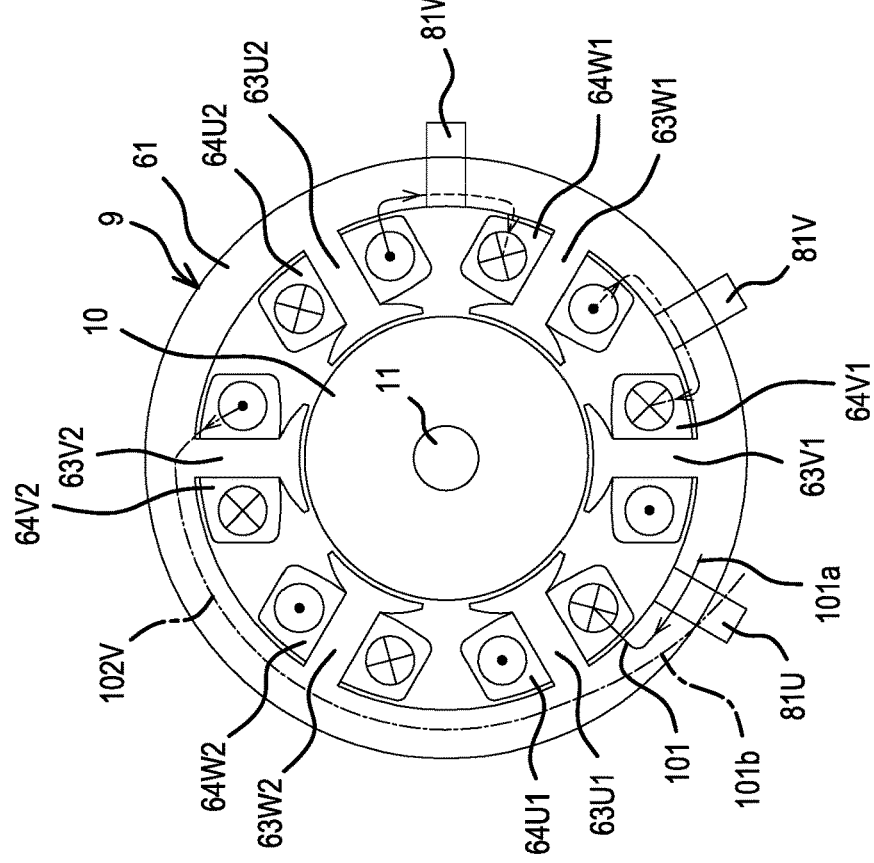

In the modified example shown in FIG. 17, first, the start end 101a is temporarily fixed, on the wiring-connection side, to the fusing terminal 81U, whereto the U-phase power-supply line 80U has been temporarily fixed. Then, the coil 64U1 is formed by winding from the right side around the tooth 63U1, which is located on the left side of the fusing terminal 81U, and then is led out, on the opposite wiring-connection side, on the left side of the tooth 63U1; the crossover wire 102U is pulled clockwise around on the outer sides of the insulating ribs 89 as a substantially semicircular portion, after which the coil 64U2 is formed by winding from the right side around the diagonally-opposite tooth 63U2. Furthermore, the wire 101 is led out, on the wiring-connection side, from the left side of the tooth 63U2 and is temporarily fixed to the fusing terminal 81W, whereto the W-phase power-supply line 80W has been temporarily fixed.

Next, the coil 64W1 is formed by winding from the right side around the tooth 63W1, which is adjacent to the left side of the fusing terminal 81W. Then, it is led out, on the opposite wiring-connection side, on the left side of the tooth 63W1; the crossover wire 102W is pulled clockwise around on the outer sides of the insulating ribs 89 as a substantially semicircular portion, after which the coil 64W2 is formed by winding from the right side around the diagonally-opposite tooth 63W2. Subsequently, it is led out, on the same opposite wiring-connection side, on the left side of the tooth 63W2; the crossover wire 102W is pulled clockwise around on the outer sides of the insulating ribs 89 as a substantially semicircular portion, then is led out, on the wiring-connection side, on the left side of the diagonally-opposite tooth 63W1 and is temporarily fixed to the fusing terminal 81V, whereto the V-phase power-supply line 80V has been temporarily fixed. That is, the wire 101 that forms the W-phase coils 64W1, 64W2 is wired, a substantially semicircular portion at a time, on the rear insulator 62 side clockwise between the teeth 63W1, 63W2.

Next, the coil 64V1 is formed by winding from the right side around the tooth 63V1, which is adjacent to the left side of the fusing terminal 81V. Then, it is led out, on the opposite wiring-connection side, on the left side of the tooth 63V1; the crossover wire 102V is pulled counterclockwise around on the outer sides of the insulating ribs 89 as a substantially semicircular portion, after which the coil 64V2 is formed by winding from the right side around the diagonally-opposite tooth 63V2. Subsequently, it is led out, on the wiring-connection side, on the left side of the tooth 63V2; the crossover wire 102V is pulled counterclockwise around as a substantially semicircular portion, after which the terminal end 101b is temporarily fixed to the fusing terminal 81U. That is, the wire 101 that forms the V-phase coils 64V1, 64V2 is divided into the rear insulator 62 side and the front insulator 61 side and is wound, a substantially semicircular portion at a time, counterclockwise between the teeth 63V1, 63V2. Therefore, even though one of the crossover wires 102 exists on the wiring-connection side, there is a maximum overlap of three crossover wires 102 on the opposite wiring-connection side, which is one fewer than the embodiment shown in FIG. 16.

In the modified example shown in FIG. 18, first, the start end 101a is temporarily fixed, on the wiring-connection side, to the fusing terminal 81U, whereto the U-phase power-supply line 80U has been temporarily fixed. Then, the coil 64U1 is formed by winding from the right side around the tooth 63U1, which is located on the left side of the fusing terminal 81U, and is then led out, on the opposite wiring-connection side, on the left side of the tooth 63U1; the crossover wire 102U is pulled clockwise around on the outer sides of the insulating ribs 89 as a substantially semicircular portion, after which the coil 64U2 is formed by winding from the right side around the diagonally-opposite tooth 63U2. Furthermore, the wire 101 is led out, on the wiring-connection side, from the left side of the tooth 63U2 and is temporarily fixed to the fusing terminal 81W, whereto the W-phase power-supply line 80W has been temporarily fixed.

Next, the coil 64W1 is formed by winding from the right side onto the tooth 63W1, which is adjacent to the left side of the fusing terminal 81W. Then, it is led out, on the opposite wiring-connection side, on the left side of the tooth 63W1; the crossover wire 102W is pulled counterclockwise around on the outer sides of the insulating ribs 89 as a substantially semicircular portion, after which the coil 64W2 is formed by winding from the right side around the diagonally-opposite tooth 63W2. Subsequently, it is led out, on the same opposite wiring-connection side, on the left side of the tooth 63W2; the crossover wire 102W is pulled counterclockwise around on the outer sides of the insulating ribs 89 as a substantially semicircular portion and then is led out, on the wiring-connection side, on the left side of the diagonally-opposite tooth 63W1 and is temporarily fixed to the fusing terminal 81V, whereto the V-phase power-supply line 80V has been temporarily fixed. That is, the wire 101 that forms the W-phase coils 64W1, 64W2 is wired counterclockwise on the rear insulator 62 side between the teeth 63W1, 63W2 by a substantially semicircular portion at a time, and the crossover wires 102W, 102W cross one another at the teeth 63W1, 63W2.

Next, the coil 64V1 is formed by winding from the right side around the tooth 63V1, which is adjacent to the left side of the fusing terminal 81V. Then, it is led out, on the opposite wiring-connection side, on the left side of the tooth 63V1; the crossover wire 102V is pulled counterclockwise around on the outer sides of the insulating ribs 89 as a substantially semicircular portion, after which the coil 64V2 is formed by winding from the right side around the diagonally-opposite tooth 63V2. Subsequently, it is led out, on the wiring-connection side, on the left side of the tooth 63V2; the crossover wire 102V is pulled counterclockwise around as a substantially semicircular portion, after which the terminal end 101b is temporarily fixed to the fusing terminal 81U. That is, the wire 101 that forms the V-phase coils 64V1, 64V2 is divided into the rear insulator 62 side and the front insulator 61 side and wired counterclockwise between the teeth 63V1, 63V2 as a substantially semicircular portion at a time. Thereby, even though one of the crossover wires 102 exists on the wiring-connection side, a maximum of three of the crossover wires 102 overlap on the opposite wiring-connection side, which is one fewer than the embodiment shown in FIG. 16.

In a modified example described below, the arrangement of the phases of the fusing terminals 81 and the winding directions of the coils 64 are the reverse of the example shown in FIG. 15 to FIG. 18.

In the modified example shown in FIG. 19, first, the start end 101a is temporarily fixed, on the wiring-connection side, to the right-most fusing terminal 81U, whereto the U-phase power-supply line 80U has been temporarily fixed. Then, the coil 64U1 is formed by winding from the left side around the tooth 63U1, which is located on the right side of the fusing terminal 81U, and then is led out, on the opposite wiring-connection side, on the right side of the tooth 63U1;

the crossover wire 102U is pulled counterclockwise around on the outer sides of the insulating ribs 89 as a substantially semicircular portion, after which the coil 64U2 is formed by winding from the left side around the diagonally-opposite tooth 63U2. Furthermore, the wire 101 is led out, on the wiring-connection side, from the right side of the tooth 63U2 and is temporarily fixed to the fusing terminal 81W, whereto the W-phase power-supply line 80W has been temporarily fixed.

Next, the coil 64W1 is formed by winding from the left side around the tooth 63W1, which is adjacent to the right side of the fusing terminal 81W. Then, it is led out, on the opposite wiring-connection side, on the right side of the tooth 63W1; the crossover wire 102W is pulled counterclockwise around on the outer sides of the insulating ribs 89 as a substantially semicircular portion, after which the coil 64W2 is formed by winding from the left side around the diagonally-opposite tooth 63W2. Subsequently, it is led out, on the same opposite wiring-connection side, on the right side of the tooth 63W2; the crossover wire 102W is pulled counterclockwise around on the outer sides of the insulating ribs 89 as a substantially semicircular portion and subsequently is led out, on the wiring-connection side, on the right side of the diagonally-opposite tooth 63W1 and is temporarily fixed to the fusing terminal 81V, whereto the V-phase power-supply line 80V has been temporarily fixed. That is, the wire 101 that forms the W-phase coils 64W1, 64W2 is wired, a substantially semicircular portion at a time, on the rear insulator 62 side counterclockwise between the teeth 63W1, 63W2.

Next, the coil 64V1 is formed by winding from the left side around the tooth 63V1, which is adjacent to the right side of the fusing terminal 81V. Then, it is led out, on the opposite wiring-connection side, on the right side of the tooth 63V1; the crossover wire 102V is pulled counterclockwise around on the outer sides of the insulating ribs 89 as a substantially semicircular portion, after which the coil 64V2 is formed by winding from the left side around the diagonally-opposite tooth 63V2. Subsequently, it is led out, on the same opposite wiring-connection side, on the right side of the tooth 63V2; the crossover wire 102V is pulled counterclockwise around on the outer sides of the insulating ribs 89 as a substantially semicircular portion and subsequently is led out, on the wiring-connection side, on the right side of the tooth 63V1. Then, the terminal end 101b is temporarily fixed to the fusing terminal 81U. That is, the wire 101 that forms the V-phase coils 64V1, 64V2 also is wired on the rear insulator 62 side counterclockwise a substantially semicircular portion at a time between the teeth 63V1, 63V2.

In the modified example shown in FIG. 20, first, the start end 101a is temporarily fixed, on the wiring-connection side, to the fusing terminal 81U, whereto the U-phase power-supply line 80U has been temporarily fixed. Then, the coil 64U1 is formed by winding from the left side around the tooth 63U1, which is located on the right side of the fusing terminal 81U, and then is led out, on the opposite wiring-connection side, on the right side of the tooth 63U1; the crossover wire 102U is pulled clockwise around on the outer sides of the insulating ribs 89 as a substantially semicircular portion, after which the coil 64U2 is formed by winding from the left side around the diagonally-opposite tooth 63U2. Furthermore, the wire 101 is led out, on the wiring-connection side, from the right side of the tooth 63U2 and is temporarily fixed to the fusing terminal 81W, whereto the W-phase power-supply line 80W has been temporarily fixed.

Next, the coil 64W1 is formed by winding from the left side around the tooth 63W1, which is adjacent to the right side of the fusing terminal 81W. Then, it is led out, on the opposite wiring-connection side, on the right side of the tooth 63W1; the crossover wire 102W is pulled clockwise around on the outer sides of the insulating ribs 89 as a substantially semicircular portion, after which the coil 64W2 is formed by winding from the left side around the diagonally-opposite tooth 63W2. Subsequently, it is led out, on the same opposite wiring-connection side, on the right side of the tooth 63W2; the crossover wire 102W is pulled clockwise around on the outer sides of the insulating ribs 89 as a substantially semicircular portion, after which it is led out, on the wiring-connection side, on the right side of the diagonally-opposite tooth 63W1 and is temporarily fixed to the fusing terminal 81V, whereto the V-phase power-supply line 80V has been temporarily fixed. That is, the wire 101 that forms the W-phase coils 64W1, 64W2 is wired, on the rear insulator 62 side, clockwise a substantially semicircular portion at a time between the teeth 63W1, 63W2, and the crossover wires 102W, 102W cross one another at the teeth 63W1, 63W2.

Next, the coil 64V1 is formed by winding from the left side around the tooth 63V1, which is adjacent to the right side of the fusing terminal 81V. Then, it is led out, on the opposite wiring-connection side, on the right side of the tooth 63V1; the crossover wire 102V is pulled clockwise around on the outer sides of the insulating ribs 89 as a substantially semicircular portion, after which the coil 64V2 is formed by winding from the left side around the diagonally-opposite tooth 63V2. Subsequently, it is led out, on the same opposite wiring-connection side, on the right side of the tooth 63V2; the crossover wire 102V is pulled clockwise around on the outer sides of the insulating ribs 89 as a substantially semicircular portion, then is led out, on the wiring-connection side, on the right side of the diagonally-opposite tooth 63V1, and the terminal end 101b is temporarily fixed to the fusing terminal 81U, which is adjacent to the right side of the tooth 63V1. That is, the wire 101 that forms the V-phase coils 64V1, 64V2 also is wired, on the rear insulator 62 side, clockwise a substantially semicircular portion at a time between the teeth 63V1, 63V2. Furthermore, because the crossover wires 102V, 102V cross one another at the teeth 63V1, 63V2, a maximum of four of the crossover wires 102 overlap.

In the modified example shown in FIG. 21, first, the start end 101a is temporarily fixed, on the wiring-connection side, to the fusing terminal 81U, whereto the U-phase power-supply line 80U has been temporarily fixed. Then, the coil 64U1 is formed by winding from the left side around the tooth 63U1, which is located on the right side of the fusing terminal 81U, and then is led out, on the opposite wiring-connection side, on the right side of the tooth 63U1; the crossover wire 102U is pulled counterclockwise around on the outer sides of the insulating ribs 89 as a substantially semicircular portion, after which the coil 64U2 is formed by winding from the left side around the diagonally-opposite tooth 63U2. Furthermore, the wire 101 is led out, on the wiring-connection side, from the right side of the tooth 63U2 and is temporarily fixed to the fusing terminal 81W, whereto the W-phase power-supply line 80W has been temporarily fixed.

Next, the coil 64W1 is formed by winding from the left side around the tooth 63W1, which is adjacent to the right side of the fusing terminal 81W. Then, it is led out, on the opposite wiring-connection side, on the right side of the tooth 63W1; the crossover wire 102W is pulled counterclockwise around on the outer sides of the insulating ribs 89 as a substantially semicircular portion, after which the coil 64W2 is formed by winding from the left side around the diagonally-opposite tooth 63W2. Subsequently, it is led out, on the same opposite wiring-connection side, on the right side of the tooth 63W2; and the crossover wire 102W is pulled counterclockwise around on the outer sides of the insulating ribs 89 as a substantially semicircular portion and then led out, on the wiring-connection side, on the right side of the diagonally-opposite tooth 63W1 and is temporarily fixed to the fusing terminal 81V, whereto the V-phase power-supply line 80V has been temporarily fixed. That is, the wire 101 that forms the W-phase coils 64W1, 64W2 is wired, on the rear insulator 62 side, counterclockwise a substantially semicircular portion at a time between the teeth 63W1, 63W2.

Next, the coil 64V1 is formed by winding from the left side around the tooth 63V1, which is adjacent to the right side of the fusing terminal 81V. Then, it is led out, on the opposite wiring-connection side, on the right side of the tooth 63V1; the crossover wire 102V is pulled clockwise around on the outer sides of the insulating ribs 89 as a substantially semicircular portion, after which the coil 64V2 is formed by winding from the left side around the diagonally-opposite tooth 63V2. Subsequently, it is led out, on the wiring-connection side, on the right side of the tooth 63V2; the crossover wire 102V is pulled clockwise around as a substantially semicircular portion, after which the terminal end 101b is temporarily fixed to the fusing terminal 81U. That is, the wire 101 that forms the V-phase coils 64V1, 64V2 is divided into the rear insulator 62 side and the front insulator 61 side and wound clockwise a substantially semicircular portion at a time between the teeth 63V1, 63V2. Thus, even though one of the crossover wires 102 exists on the wiring-connection side, there is a maximum overlap of three of the crossover wires 102 on the opposite wiring-connection side, which is one fewer than the embodiment shown in FIG. 20.

Figure 22B:
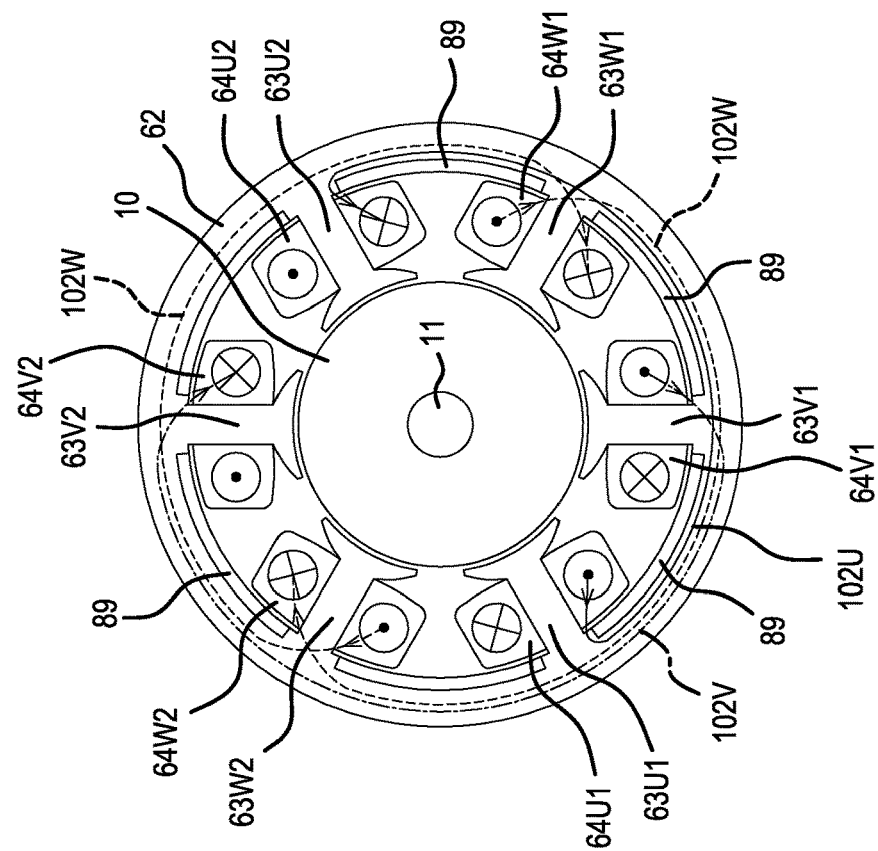
Figure 22A:
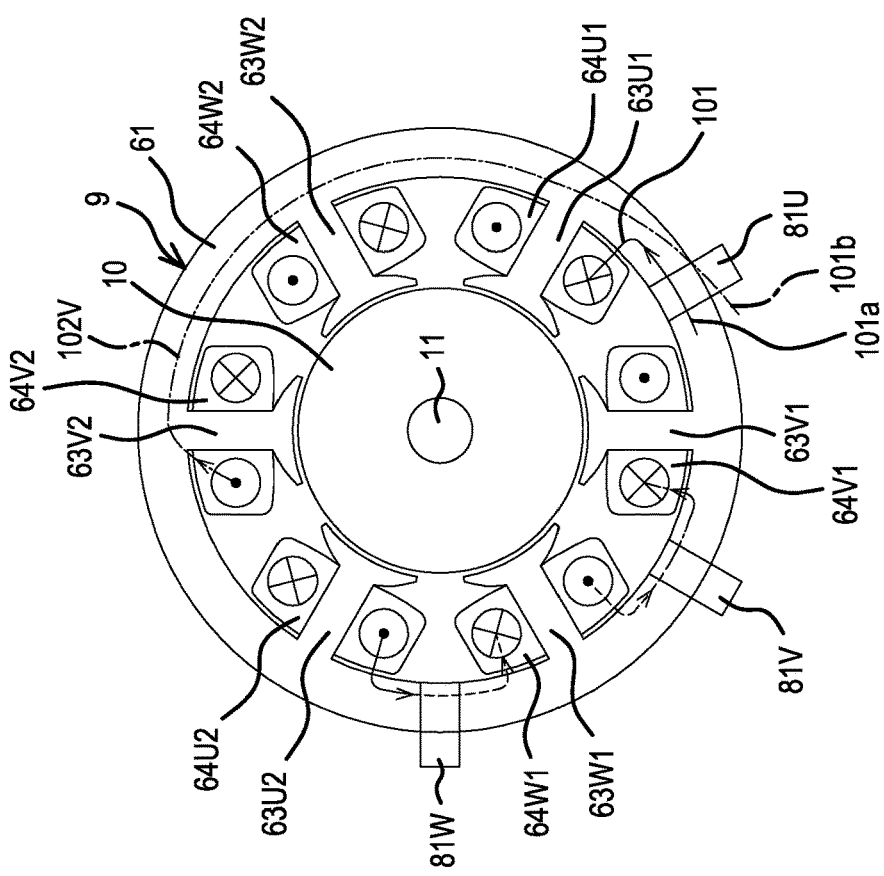

In the modified example shown in FIG. 22, first, the start end 101a is temporarily fixed, on the wiring-connection side, to the fusing terminal 81U, whereto the U-phase power-supply line 80U has been temporarily fixed. Then, the coil 64U1 is formed by winding from the left side around the tooth 63U1, which is located on the right side of the fusing terminal 81U, and then is led out, on the opposite wiring-connection side, on the right side of the tooth 63U1; the crossover wire 102U is pulled counterclockwise around on the outer sides of the insulating ribs 89 as a substantially semicircular portion, after which the coil 64U2 is formed by winding from the left side around the diagonally-opposite tooth 63U2. Furthermore, the wire 101 is led out, on the wiring-connection side, from the right side of the tooth 63U2 and is temporarily fixed to the fusing terminal 81W, whereto the W-phase power-supply line 80W has been temporarily fixed.

Next, the coil 64W1 is formed by winding from the left side around the tooth 63W1, which is adjacent to the right side of the fusing terminal 81W. Then, it is led out, on the opposite wiring-connection side, on the right side of the tooth 63W1; the crossover wire 102W is pulled clockwise around on the outer sides of the insulating ribs 89 as a substantially semicircular portion, after which the coil 64W2 is formed by winding from the left side around the tooth 63W2 on the diagonal. Subsequently, it is led out, on the same opposite wiring-connection side, on the right side of the tooth 63W2; the crossover wire 102W is pulled clockwise around on the outer sides of the insulating ribs 89 as a substantially semicircular portion, and then is led out, on the wiring-connection side, on the right side of the diagonally-opposite tooth 63W1 and is temporarily fixed to the fusing terminal 81V, whereto the V-phase power-supply line 80V has been temporarily fixed. That is, the wire 101 that forms the W-phase coils 64W1, 64W2 is wired, on the rear insulator 62 side, clockwise by a substantially semicircular portion at a time between the teeth 63W1, 63W2, and the crossover wires 102W, 102W cross one another at the teeth 63W1, 63W2.

Next, the coil 64V1 is formed by winding from the left side around the tooth 63V1, which is adjacent to the right side of the fusing terminal 81V. Then, it is led out, on the opposite wiring-connection side, on the right side of the tooth 63V1; the crossover wire 102V is pulled clockwise around on the outer sides of the insulating ribs 89 as a substantially semicircular portion, after which the coil 64V2 is formed by winding from the left side around the diagonally-opposite tooth 63V2. Subsequently, it is led out, on the wiring-connection side, on the right side of the tooth 63V2; the crossover wire 102V is pulled clockwise around as a substantially semicircular portion, after which the terminal end 101b is temporarily fixed to the fusing terminal 81U. That is, the wire 101 that forms the V-phase coils 64V1, 64V2 is divided into the rear insulator 62 side and the front insulator 61 side and wired clockwise a substantially semicircular portion at a time between the teeth 63V1, 63V2. Thus, even though one of the crossover wires 102 exists on the wiring-connection side, a maximum of three of the crossover wires 102 overlap on the opposite wiring-connection side, which is one fewer than the embodiment shown in FIG. 20.

Figure 23B:
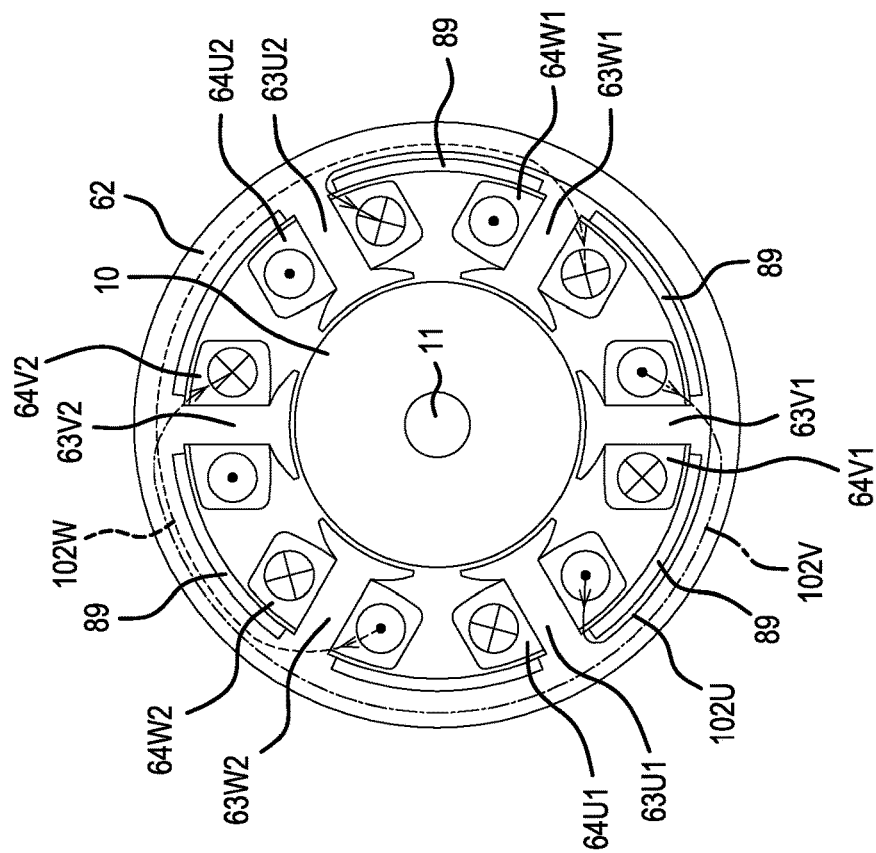
Figure 23A:
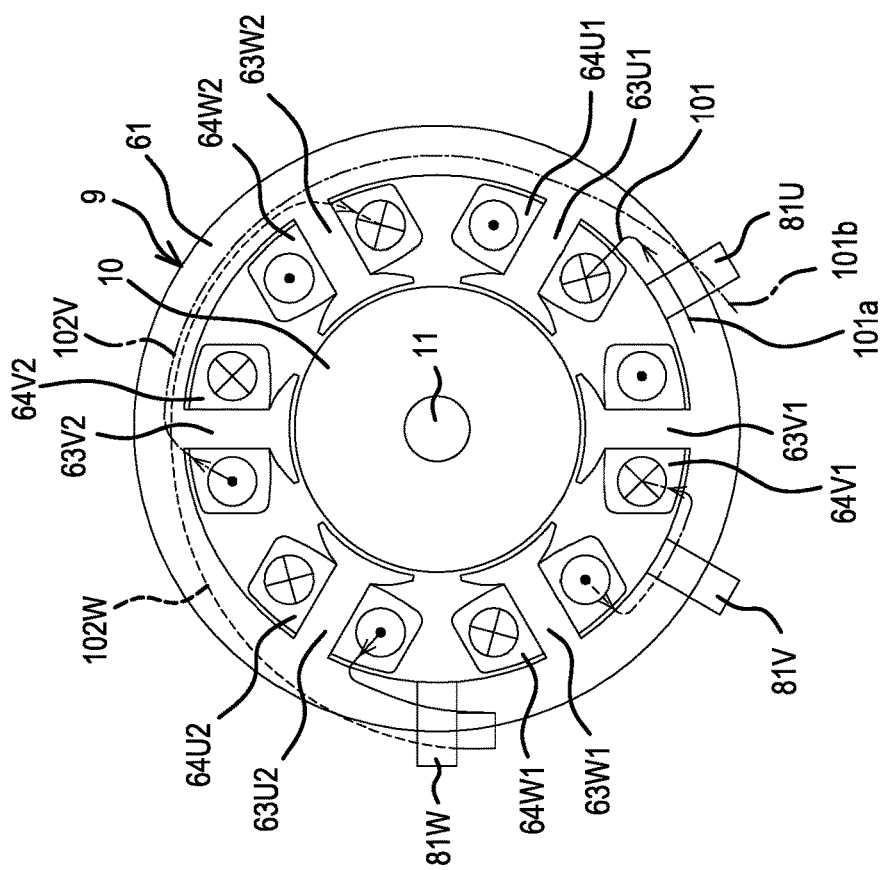

In the modified example shown in FIG. 23, first, the start end 101a is temporarily fixed, on the wiring-connection side, to the fusing terminal 81U, whereto the U-phase power-supply line 80U has been temporarily fixed. Then, the coil 64U1 is formed by winding from the left side around the tooth 63U1, which is located on the right side of the fusing terminal 81U, and then is led out, on the opposite wiring-connection side, on the right side of the tooth 63U1; the crossover wire 102U is pulled counterclockwise around on the outer sides of the insulating ribs 89 as a substantially semicircular portion, after which the coil 64U2 is formed by winding from the left side around the diagonally-opposite tooth 63U2. Furthermore, the wire 101 is led out, on the wiring-connection side, from the right side of the tooth 63U2 and is temporarily fixed, in a folded-back state, to the fusing terminal 81W, whereto the W-phase power-supply line 80W has been temporarily fixed.

Next, the crossover wire 102W is pulled clockwise from the fusing terminal 81W as a substantially semicircular portion, and the coil 64W2 is formed by winding from the left side around the tooth 63W2, which is adjacent to the right side of the tooth 63U1. Then, it is led out, on the opposite wiring-connection side, on the right side of the tooth 63W2; the crossover wire 102W is pulled clockwise around on the outer sides of the insulating ribs 89 as a substantially semicircular portion, after which the coil 64W1 is formed by winding from the left side around the diagonally-opposite tooth 63W1. Subsequently, it is led out, on the wiring-connection side, on the right side of the tooth 63W1 and is temporarily fixed to the fusing terminal 81V, whereto the V-phase power-supply line 80V has been temporarily fixed. That is, the wire 101 that forms the W-phase coils 64W1, 64W2 is divided into the front insulator 61 side and the rear insulator 62 side and is wired clockwise a substantially semicircular portion at a time.

Next, the coil 64V1 is formed by winding from the left side around the tooth 63V1, which is adjacent to the right side of the fusing terminal 81V. Then, it is led out, on the opposite wiring-connection side, on the right side of the tooth 63V1; the crossover wire 102V is pulled clockwise around on the outer sides of the insulating ribs 89 as a substantially semicircular portion, after which the coil 64V2 is formed by winding from the left side around the diagonally-opposite tooth 63V2. Subsequently, it is led out, on the wiring-connection side, on the right side of the tooth 63V2; the crossover wire 102V is pulled clockwise around as a substantially semicircular portion, after which the terminal end 101b is temporarily fixed to the fusing terminal 81U. That is, the wire 101 that forms the V-phase coils 64V1, 64V2 also is divided into the front insulator 61 side and the rear insulator 62 side and is wired clockwise a substantially semicircular portion at a time.

Figure 24B:
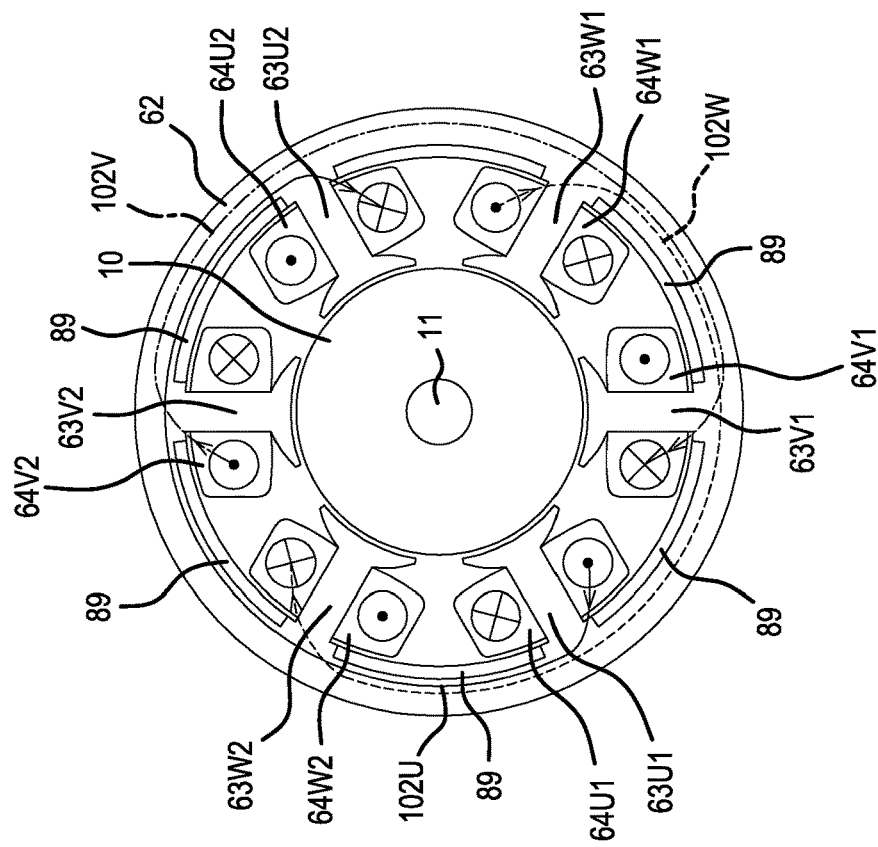
Figure 24A:
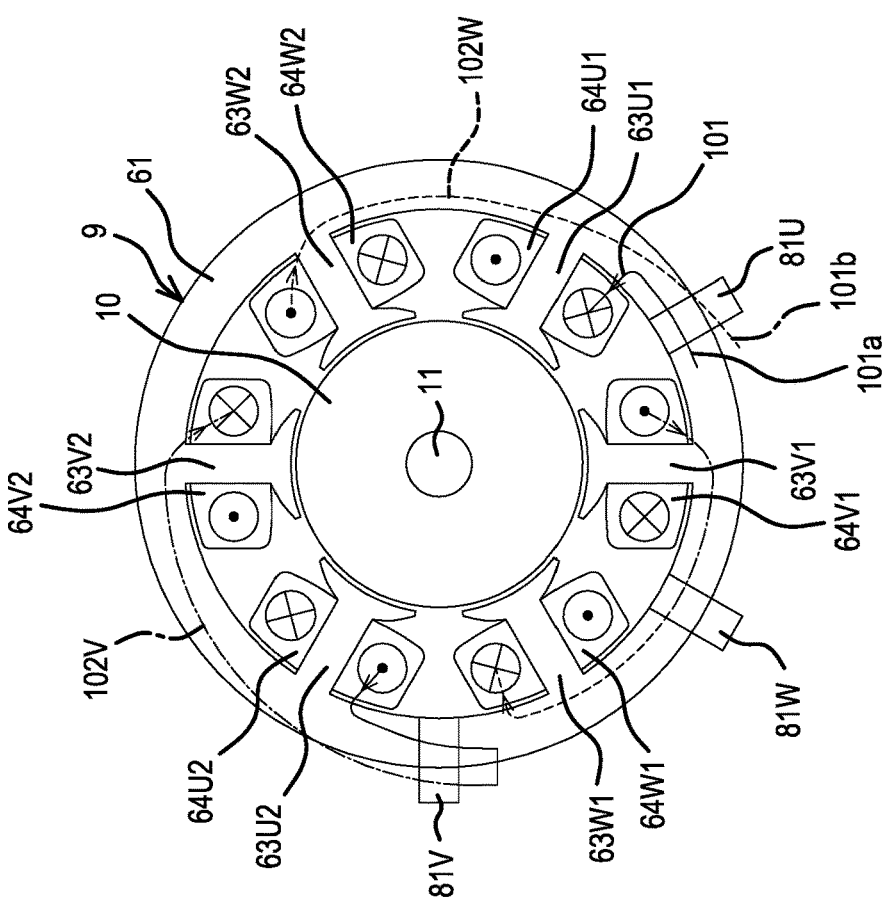

In the modified example shown in FIG. 24, the locations of the fusing terminals 81V, 81W are the reverse of that shown in FIG. 23. First, the start end 101a is temporarily fixed, on the wiring-connection side, to the fusing terminal 81U, whereto the U-phase power-supply line 80U has been temporarily fixed. Then, the coil 64U1 is formed by winding from the left side around the tooth 63U1, which is located on the right side of the fusing terminal 81U, and then led out, on the opposite wiring-connection side, on the right side of the tooth 63U1; the crossover wire 102U is pulled clockwise around on the outer sides of the insulating ribs 89 as a substantially semicircular portion, after which the coil 64U2 is formed by winding from the left side around the diagonally-opposite tooth 63U2. Furthermore, the wire 101 is led out, on the wiring-connection side, from the right side of the tooth 63U2 and is temporarily fixed, in a folded-back state, to the fusing terminal 81V, whereto the V-phase power-supply line 80V has been temporarily fixed.

Next, the crossover wire 102V is pulled clockwise around from the fusing terminal 81V, and the coil 64V2 is formed by winding from the left side around the tooth 63V2, which is adjacent to the left side of the tooth 63U2. Then, it is led out, on the opposite wiring-connection side, on the right side of the tooth 63V2; the crossover wire 102V is pulled clockwise around on the outer sides of the insulating ribs 89 as a substantially semicircular portion, after which the coil 64V1 is formed by winding from the left side around the diagonally-opposite tooth 63V1. Subsequently, it is pulled clockwise around, on the wiring-connection side, from the right side of the tooth 63V1 and is temporarily fixed to the fusing terminal 81W, whereto the W-phase power-supply line 80W has been temporarily fixed. That is, the wire 101 that forms the V-phase coils 64V1, 64V2 is wired on the front insulator 61 side clockwise between the fusing terminal 81V and the tooth 63V2 and between the tooth 63V1 and the fusing terminal 81W, and is wired on the rear insulator 62 side clockwise by a substantially semicircular portion between the teeth 63V2, 63V1.

Next, the coil 64W1 is formed by winding from the left side onto the tooth 63W1, which is adjacent to the left side of the fusing terminal 81W. Then, it is led out, on the opposite wiring-connection side, on the right side of the tooth 63W1; the crossover wire 102W is pulled clockwise around on the outer sides of the insulating ribs 89 as a substantially semicircular portion, after which the coil 64W2 is formed by winding from the left side around the diagonally-opposite tooth 63W2. Subsequently, it is led out, on the wiring-connection side, on the right side of the tooth 63W2, and the crossover wire 102W is pulled clockwise around, after which the terminal end 101b is temporarily fixed to the fusing terminal 81U. That is, the wire 101 that forms the W-phase coils 64W1, 64W2 also is wired on the front insulator 61 side clockwise between the fusing terminal 81W and the tooth 63W1 and between the tooth 63W2 and the fusing terminal 81U, and is wired on the rear insulator 62 side clockwise by a substantially semicircular portion between the teeth 63W1, 63W2.

It is noted that, in the aspects of the present teachings related to the cooling of the coils, the power tool is not limited to a hammer driver-drill, and the present teachings also can be readily adapted to other types of power tools, such as impact drivers, grinders, etc., as long as it includes a motor that serves as a drive source and has a sensor-circuit board fastened to an electrically insulating member. Accordingly, the position, orientation, etc. of the motor inside the housing can also be modified as appropriate. In addition, in the above-described embodiments, the coils are formed by (from) one (a single continuous) wire (winding wire), but it is also possible to form the coils using two, three, or a plurality of discrete (discontinuous) winding wires. Of course, the winding routes are not limited to delta connections, and e.g., Y connections may also be advantageously used with the present teachings.

Moreover, in the aspects of the present teachings related to the arrangement of the terminals, too, the power tool is not limited to a hammer driver-drill, and the present teachings also can be adapted to other types of power tools, such as impact drivers, grinders, etc., as long as it includes a motor that serves as a drive source and has terminals, to which coils are wired, provided on an electrically insulating member. Accordingly, the area in which the terminals are disposed may be an upper half, a transverse half, or the like depending on the type of power tool. Furthermore, even if the three-phase winding is a Y connection, compact designs can still be achieved by the arrangement of the terminals according to the present teachings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings to provide improved power tools.

Moreover, combinations of features and steps disclosed in the above detailed description, as well as in the below additional examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Hammer driver-drill
2 Main body
3 Handle
4 Drill chuck
5 Battery pack
6 Housing
8 Brushless motor
9 Stator
10 Rotor
11 Rotary shaft
12 Gear assembly
13 Spindle
20 Controller
33 Planetary-gear speed-reducing mechanism
60 Stator core
61 Front insulator
62 Rear insulator
63 Tooth
64 Coil
65 Sensor-circuit board
67 Rotor core
70 Centrifugal fan
71 Air-exhaust port
72 Air-suction port
75 Groove
76 Mating piece
79 Slot
80 Power-supply line
81 Fusing terminal
82 Retaining part
85 Screw boss
89 Insulating rib
91 Notched part (notch)
92 Fixing piece
95 Connection part
96 Lead wire
101 Wire
101a Start end
101b Terminal end
102 Crossover wire

The invention claimed is:

1. A power tool having a motor that comprises:
a stator comprising: a tubular stator core having six teeth that protrude radially inwardly from an inner side of the stator core, a first electrically insulating member affixed to a first axial end of the stator core, a second electrically insulating member affixed to a second axial end of the stator core, and six coils respectively wound around the six teeth such that three phases are defined;
a rotor comprising a rotor core disposed in the interior of the stator and a rotary shaft fixed to the rotor core; and
three terminals held by the first electrically insulating member, the three terminals being respectively electrically connected to the three phases;
wherein:
all of the six coils are formed by winding a single continuous winding wire sequentially around each of the six teeth; and
a first crossover wire portion of the single continuous winding wire is disposed on the second electrically insulating member and extends between the two of the teeth of the same phase.

2. The power tool according to claim 1, wherein:
all of the three terminals are disposed within a semicircular area of the stator core.

3. The power tool according to claim 1, wherein:
the single continuous winding wire further comprises second and third crossover wire portions;
all of the first, second and third crossover wire portions are disposed on the second electrically insulating member and respectively extend between the two of the teeth of the same phase; and
all of the first, second and third crossover wire portions are disposed within a half-circle shape.

4. The power tool according to claim 3, further comprising:
a plurality of ribs integrally formed with the second electrically insulating member;
wherein the ribs respectively act as guides for the first, second and third crossover wire portions.

5. The power tool according to claim 1, wherein the three phases are defined by diametrically opposite pairs of the coils.

6. The power tool according to claim 1, wherein the three terminals are each respectively disposed between two circumferentially adjacent ones of the teeth.

7. The power tool according to claim 1, wherein second and third crossover wire portions of the single continuous winding wire are also disposed on the second electrically insulating member and respectively extend between the two of the teeth of the same phase.

8. The power tool according to claim 7, wherein each of the first, second and third crossover wire portions are disposed in a half-circle shape.

9. The power tool according to claim 8, wherein the three terminals are each respectively disposed between two circumferentially adjacent ones of the teeth.

10. The power tool according to claim 9, further comprising:
a plurality of ribs integrally formed with the second electrically insulating member;
wherein the ribs respectively act as guides for the first, second and third crossover wire portions.

11. The power tool according to claim 10, wherein:
the ribs are disposed equispaced around a circumference of the second electrically insulating member and extend in the axial direction of the motor, and
each of the ribs is respectively disposed between two circumferentially adjacent ones of the teeth.

12. A power tool having a motor that comprises:
a stator comprising: a tubular stator core having a first tooth, a second tooth, a third tooth, a fourth tooth, a fifth tooth and a sixth tooth that all protrude radially inwardly from an inner side of the stator core, the first to sixth teeth being respectively arranged in a circumferential direction of the tubular stator core so that the first to sixth teeth are adjacently positioned in order, an electrically insulating member affixed to the stator core, and first to sixth coils respectively wound around the first to sixth teeth;
a rotor comprising a rotor core disposed in the interior of the stator and a rotary shaft fixed to the rotor core; and
a first terminal, a second terminal and a third terminal that are all held by the electrically insulating member and are all located within a circumferentially-extending arc extending in a clockwise or counterclockwise direction, according to a plan view of the tubular stator core, the circumferentially-extending arc having the first tooth and the fourth tooth as its end points, wherein:
the first terminal is electrically coupled to a wire or wire portion electrically connecting the first coil and the second coil,
the second terminal is electrically coupled to a wire or wire portion electrically connecting the second coil and the third coil, and
the third terminal is electrically coupled to a wire or wire portion electrically connecting the third coil and the fourth coil.

13. A power tool having a motor that comprises:
a stator comprising: a tubular stator core having six teeth that protrude radially inwardly from an inner side of the stator core, a first electrically insulating member affixed to a first axial end of the stator core, a second electrically insulating member affixed to a second axial end of the stator core, and six coils respectively wound around the six teeth such that three phases are defined;
a rotor comprising a rotor core disposed in the interior of the stator and a rotary shaft fixed to the rotor core; and
three terminals held by the first electrically insulating member, the three terminals being respectively electrically connected to the three phases;
wherein:
the three phases are defined by diametrically opposite pairs of the coils;
the three terminals do not axially overlap the stator core; and
the six coils are located radially inward of the three terminals.

14. The power tool according to claim 13, wherein the three terminals are each respectively disposed between two circumferentially adjacent ones of the teeth.

15. The power tool according to claim 13, wherein:
all of the six coils are formed by winding a single continuous winding wire sequentially around each of the six teeth; and
a first crossover wire portion of the single continuous winding wire is disposed on the second electrically insulating member and extends between the two of the teeth of the same phase.

16. The power tool according to claim 14, wherein second and third crossover wire portions of the single continuous winding wire are also disposed on the second electrically insulating member and respectively extend between the two of the teeth of the same phase.

17. The power tool according to claim 16, wherein each of the first, second and third crossover wire portions are disposed in a half-circle shape.

18. The power tool according to claim 17, wherein the three terminals are each respectively disposed between two circumferentially adjacent ones of the teeth.

19. The power tool according to claim 18, further comprising:
a plurality of ribs integrally formed with the second electrically insulating member;
wherein the ribs respectively act as guides for the first, second and third crossover wire portions.

20. The power tool according to claim 19, wherein:
the ribs are disposed equispaced around a circumference of the second electrically insulating member and extend in the axial direction of the motor, and
each of the ribs is respectively disposed between two circumferentially adjacent ones of the teeth.

* * * * *